(12) United States Patent
Smith et al.

(10) Patent No.: US 12,333,427 B2
(45) Date of Patent: Jun. 17, 2025

(54) MULTI-SCALE OUTPUT TECHNIQUES FOR GENERATIVE ADVERSARIAL NETWORKS

(71) Applicant: Adobe Inc., San Jose, CA (US)

(72) Inventors: Cameron Smith, Santa Cruz, CA (US); Ratheesh Kalarot, San Jose, CA (US); Wei-An Lin, San Jose, CA (US); Richard Zhang, San Francisco, CA (US); Niloy Mitra, London (GB); Elya Shechtman, Seattle, WA (US); Shabnam Ghadar, Menlo Park, CA (US); Zhixin Shu, San Jose, CA (US); Yannick Hold-Geoffrey, San Jose, CA (US); Nathan Carr, San Jose, CA (US); Jingwan Lu, Santa Clara, CA (US); Oliver Wang, Seattle, WA (US); Jun-Yan Zhu, San Jose, CA (US)

(73) Assignee: Adobe Inc., San Jose, CA (US)

( * ) Notice: Subject to any disclaimer, the term of this patent is extended or adjusted under 35 U.S.C. 154(b) by 630 days.

(21) Appl. No.: 17/384,283

(22) Filed: Jul. 23, 2021

(65) Prior Publication Data
US 2022/0122222 A1    Apr. 21, 2022

Related U.S. Application Data

(60) Provisional application No. 63/092,980, filed on Oct. 16, 2020.

(51) Int. Cl.
*G06N 3/08* (2023.01)
*G06F 3/04845* (2022.01)
(Continued)

(52) U.S. Cl.
CPC ........... *G06N 3/08* (2013.01); *G06F 3/04845* (2013.01); *G06F 3/04847* (2013.01);
(Continued)

(58) Field of Classification Search
None
See application file for complete search history.

(56) References Cited

U.S. PATENT DOCUMENTS 9,129,190 B1    9/2015  Ranzato
9,373,057 B1    6/2016  Erhan et al.
(Continued)

FOREIGN PATENT DOCUMENTS

CN    110796080 A  *  2/2020
EP      3872747 A1  *  9/2021  ........... G06T 3/4046

OTHER PUBLICATIONS

Notice of Allowance, mailed Jul. 7, 2023, U.S. Appl. No. 17/384,357, 13 pages.
(Continued)

*Primary Examiner* — Fan Zhang
(74) *Attorney, Agent, or Firm* — Kilpatrick Townsend & Stockton LLP

(57) ABSTRACT

An improved system architecture uses a Generative Adversarial Network (GAN) including a specialized generator neural network to generate multiple resolution output images. The system produces a latent space representation of an input image. The system generates a first output image at a first resolution by providing the latent space representation of the input image as input to a generator neural network comprising an input layer, an output layer, and a plurality of intermediate layers and taking the first output image from an intermediate layer, of the plurality of intermediate layers of the generator neural network. The system generates a second output image at a second resolution different from the first resolution by providing the latent space representation of the input image as input to the generator neural network and taking the second output image from the output layer of the generator neural network.

14 Claims, 17 Drawing Sheets
(10 of 17 Drawing Sheet(s) Filed in Color)

(51) Int. Cl.

| | |
|---|---|
| *G06F 3/04847* | (2022.01) |
| *G06F 18/21* | (2023.01) |
| *G06F 18/211* | (2023.01) |
| *G06F 18/214* | (2023.01) |
| *G06F 18/40* | (2023.01) |
| *G06N 3/045* | (2023.01) |
| *G06N 20/20* | (2019.01) |
| *G06T 3/02* | (2024.01) |
| *G06T 3/18* | (2024.01) |
| *G06T 3/40* | (2024.01) |
| *G06T 3/4038* | (2024.01) |
| *G06T 3/4046* | (2024.01) |
| *G06T 5/20* | (2006.01) |
| *G06T 5/77* | (2024.01) |
| *G06T 11/00* | (2006.01) |
| *G06T 11/60* | (2006.01) |
| *G06V 10/28* | (2022.01) |
| *G06V 10/98* | (2022.01) |

(52) U.S. Cl.
CPC .......... *G06F 18/211* (2023.01); *G06F 18/214* (2023.01); *G06F 18/2163* (2023.01); *G06F 18/40* (2023.01); *G06N 3/045* (2023.01); *G06N 20/20* (2019.01); *G06T 3/02* (2024.01); *G06T 3/18* (2024.01); *G06T 3/40* (2013.01); *G06T 3/4038* (2013.01); *G06T 3/4046* (2013.01); *G06T 5/20* (2013.01); *G06T 5/77* (2024.01); *G06T 11/001* (2013.01); *G06T 11/60* (2013.01); *G06V 10/28* (2022.01); *G06V 10/98* (2022.01); *G06T 2207/10024* (2013.01); *G06T 2207/20081* (2013.01); *G06T 2207/20084* (2013.01); *G06T 2207/20221* (2013.01); *G06T 2210/22* (2013.01)

(56) References Cited

U.S. PATENT DOCUMENTS

| | | | |
|---|---|---|---|
| 10,373,055 | B1 | 8/2019 | Matthey-de-l'Endroit et al. |
| 10,430,946 | B1 | 10/2019 | Zhou et al. |
| 10,671,838 | B1 | 6/2020 | Bogan et al. |
| 10,825,219 | B2 | 11/2020 | Fu et al. |
| 10,902,571 | B2 | 1/2021 | Naruniec et al. |
| 11,200,638 | B2 | 12/2021 | He et al. |
| 11,222,466 | B1 | 1/2022 | Naruniec et al. |
| 11,227,187 | B1 | 1/2022 | Weinberger |
| 11,354,792 | B2 | 6/2022 | Fisher et al. |
| 11,354,823 | B2 | 6/2022 | Lerchner et al. |
| 11,494,667 | B2 | 11/2022 | Carbune et al. |
| 11,508,167 | B2 | 11/2022 | Deng et al. |
| 11,521,362 | B2 | 12/2022 | Bondich et al. |
| 11,544,880 | B2 | 1/2023 | Park et al. |
| 11,557,022 | B2 | 1/2023 | Munkberg et al. |
| 11,580,673 | B1 | 2/2023 | Ren et al. |
| 11,610,435 | B2 | 3/2023 | Karras et al. |
| 11,676,014 | B1 | 6/2023 | Hallac |
| 11,682,199 | B2 | 6/2023 | Karras et al. |
| 11,797,769 | B1 | 10/2023 | Gangadharaiah et al. |
| 11,875,221 | B2 | 1/2024 | Lin et al. |
| 11,880,766 | B2 | 1/2024 | Smith et al. |
| 11,907,839 | B2 | 2/2024 | Kalarot et al. |
| 11,915,133 | B2 | 2/2024 | Kalarot et al. |
| 11,978,268 | B2 | 5/2024 | Deng et al. |
| 2012/0301023 | A1 | 11/2012 | Braun et al. |
| 2015/0063450 | A1 | 3/2015 | Kim et al. |
| 2015/0277686 | A1 | 10/2015 | Laforge et al. |
| 2015/0371422 | A1 | 12/2015 | Kokemohr |
| 2018/0247201 | A1 | 8/2018 | Liu et al. |
| 2018/0314716 | A1 | 11/2018 | Kim et al. |
| 2019/0171908 | A1 | 6/2019 | Salavon |
| 2019/0172243 | A1 | 6/2019 | Mishra et al. |
| 2019/0213772 | A1 | 7/2019 | Lombardi et al. |
| 2019/0294108 | A1* | 9/2019 | Ozcan ................... G06V 10/82 |
| 2019/0295302 | A1 | 9/2019 | Fu et al. |
| 2019/0378242 | A1 | 12/2019 | Zhang et al. |
| 2019/0385064 | A1 | 12/2019 | Malaya |
| 2020/0034455 | A1 | 1/2020 | Chandra Sekar Rao et al. |
| 2020/0089755 | A1 | 3/2020 | Shazeer et al. |
| 2020/0134778 | A1 | 4/2020 | He et al. |
| 2020/0151559 | A1 | 5/2020 | Karras et al. |
| 2020/0242771 | A1 | 7/2020 | Park et al. |
| 2020/0242774 | A1 | 7/2020 | Park et al. |
| 2020/0250471 | A1 | 8/2020 | Saruta et al. |
| 2020/0349393 | A1 | 11/2020 | Zhong |
| 2020/0372297 | A1 | 11/2020 | Terjek |
| 2020/0372370 | A1 | 11/2020 | Donahue et al. |
| 2020/0372621 | A1 | 11/2020 | Naruniec et al. |
| 2020/0380338 | A1* | 12/2020 | Matsumura ............. G06F 18/22 |
| 2021/0019541 | A1 | 1/2021 | Wang et al. |
| 2021/0142177 | A1 | 5/2021 | Mallya et al. |
| 2021/0182687 | A1 | 6/2021 | Son et al. |
| 2021/0209464 | A1 | 7/2021 | Bala et al. |
| 2021/0271867 | A1 | 9/2021 | Liu et al. |
| 2021/0279513 | A1 | 9/2021 | Jie |
| 2021/0283717 | A1 | 9/2021 | Iyer et al. |
| 2021/0319209 | A1 | 10/2021 | Deng et al. |
| 2021/0327038 | A1 | 10/2021 | Helminger et al. |
| 2021/0334935 | A1 | 10/2021 | Grigoriev et al. |
| 2021/0374402 | A1 | 12/2021 | Kim et al. |
| 2022/0044352 | A1 | 2/2022 | Liao et al. |
| 2022/0051479 | A1 | 2/2022 | Agarwal et al. |
| 2022/0076374 | A1 | 3/2022 | Li et al. |
| 2022/0084173 | A1 | 3/2022 | Liang et al. |
| 2022/0084204 | A1* | 3/2022 | Li ............................ G06N 3/08 |
| 2022/0108163 | A1 | 4/2022 | Sokhandan Asl |
| 2022/0121876 | A1 | 4/2022 | Kalarot et al. |
| 2022/0121931 | A1 | 4/2022 | Kalarot et al. |
| 2022/0121932 | A1 | 4/2022 | Kalarot et al. |
| 2022/0122221 | A1 | 4/2022 | Smith et al. |
| 2022/0122222 | A1 | 4/2022 | Smith et al. |
| 2022/0122232 | A1 | 4/2022 | Lin et al. |
| 2022/0122305 | A1 | 4/2022 | Smith et al. |
| 2022/0122306 | A1 | 4/2022 | Lin et al. |
| 2022/0122307 | A1 | 4/2022 | Kalarot et al. |
| 2022/0122308 | A1 | 4/2022 | Kalarot et al. |
| 2022/0138897 | A1 | 5/2022 | Singh et al. |
| 2022/0148244 | A1 | 5/2022 | Ko et al. |
| 2022/0156886 | A1 | 5/2022 | Petrangeli et al. |
| 2022/0198266 | A1 | 6/2022 | Chakraborty et al. |
| 2022/0254071 | A1 | 8/2022 | Ojha et al. |
| 2022/0309672 | A1 | 9/2022 | Cherian et al. |
| 2022/0366193 | A1 | 11/2022 | Luo et al. |
| 2023/0094954 | A1 | 3/2023 | Sinha et al. |
| 2023/0195281 | A1 | 6/2023 | Charlton et al. |
| 2023/0214953 | A1 | 7/2023 | Yoo |

OTHER PUBLICATIONS

Non-Final Office Action, mailed Jun. 22, 2023, U.S. Appl. No. 17/468,476, 15 pages.

Hahn et al., "Disentangling Latent Factors of Variational Auto-Encoder with Whitening", Artificial Neural Networks and Machine Learning—ICANN, 2019, pp. 590-603.

Liu et al., "Towards Disentangling Latent Space for Unsupervised Semantic Face Editing", IEEE, Trans Image Process, 2022, 14 pages.

Zhu et al., "Generative Visual Manipulation on the Natural Image Manifold", arXiv:1609.03552 [cs.CV], Dec. 1, 356, 2018, 16 pages.

Corrected Notice of Allowability, mailed Nov. 17, 2023, U.S. Appl. No. 17/468,476, 2 pages.

Notice of Allowance, mailed Nov. 13, 2023, U.S. Appl. No. 17/468,511, 10 pages.

Supplemental Notice of Allowability, mailed Nov. 17, 2023, U.S. Appl. No. 17/468,546, 2 pages.

Gur et al., "Hierarchical Patch Vae-gan: Generating Diverse Videos From a Single Sample", Advances in Neural Information Processing Systems, vol. 33, Available online at: https://doi.org/10.48550/arXiv.2006.12226, 2020, pp. 16761-16772.

(56) References Cited

OTHER PUBLICATIONS

Kalarot et al., "Component Attention Guided Face Super-Resolution Network: Cagface", Proceedings of the IEEE/CVF Winter Conference on Applications of Computer Vision, 2020.
Karnewar et al., "Msg-gan: Multi-scale Gradients for Generative Adversarial Networks", Proceedings of the IEEE/CVF Conference on Computer Vision and Pattern Recognition, Available online at: https://doi.org/10.48550/arXiv.1903.06048, 2020, pp. 1-18.
Kohl et al., "A Hierarchical Probabilistic U-net for Modeling Multi-scale Ambiguities", Available Online At: https://doi.org/10.48550/arXiv.1905.13077, May 30, 2019, pp. 1-25.
Yi et al., "Bsd-gan: Branched Generative Adversarial Network for Scale-disentangled Representation Learning and Image Synthesis", IEEE Transactions on Image Processing, vol. 29, Available Online At: https://ieeexplore.ieee.org/document/9165961, 2020, pp. 9073-9083.
Zhang et al., "Nested Scale-editing for Conditional Image Synthesis", Proceedings of the IEEE/CVF Conference on Computer Vision and Pattern Recognition, Available Online At: https://arxiv.org/abs/2006.02038, Jun. 3, 2020, pp. 1-18.
Gao et al, "Res2Net: A New Multi-scale Backbone Architecture", arXiv:1904.01169v3 [cs.CV], Jan. 27, 2021, 11 pages.
Minaee et al., "Image Segmentation Using Deep Learning: A Survey", IEEE Transactions on Pattern Analysis and Machine Intelligence, doi: 10.1109/TPAMI.2021.3059968, arXiv:2001.05566v5 [cs.CV], Nov. 15, 2020, 22 pages.
Richardson et al., "Encoding in Style: a StyleGAN Encoder for Image-to-Image Translation", arXiv:2008.00951v1 [cs.CV], Aug. 3, 2020, 16 pages.
Wiles et al., "Using Bottlenecks in Feedforward Networks as a Dimension Reduction Technique: An Application to Optimization Tasks", Neural Computation 8, 1179-1183, 1996, Downloaded from http://direct.mit.edu/neco/article-pdf/8/6/1179/813336/neco.1996.8.6.1179.pdf on Apr. 28, 2021, 5 pages.
Abdal et. al., "StyleFlow: Attribute-conditioned Exploration of StyleGAN-Generated Images using Conditional Continuous Normalizing Flows", arXiv:2008.02401v2 [cs.CV], Sep. 20, 2020, 22 pages.
Abdulnabi et. al., "Multi-task CNN Model for Attribute Prediction", arXiv:1601.00400v1 [cs.CV], Jan. 4, 2016, 11 pages.
Karim, Raimi "Intuitions on L1 and L2 Regularisation", Towards Data Science, Dec. 26, 2018, 11 pages.
Pang et al, "Image-to-Image Translation: Methods and Applications," arXiv:2101.08629v1 [cs.CV], Jan. 21, 2021, 19 pages.
Tewari, et al. "StyleRig: Rigging StyleGAN for 3D Control over Portrait Images", 13 pages.
Zhu et al., "Generative Visual Manipulation on the Natural Image Manifold", arXiv: 1609.03552v3 [cs.CV], Dec. 16, 2018.
Biswas et al., "Spatially Variant Laplacian Pyramids for Multi-Frame Exposure Fusion," arXiv:2002.01425v1, Feb. 4, 2020, 10 pages.
Burt et al., "The Laplacian Pyramid as a Compact Image Code," IEE Transactions on Communications vol. Com-31, No. 4, Apr. 1983, pp. 532-540.
Dahlke et al., "Multiscale Approximation," Understanding Complex Systems, 2007, 35 pages.
Glasbey et al., "A Review of Image Warping Methods," Journal of Applied Statistics 25, 1998, pp. 155-171.
Karasaridis et al., "A Filter Design Technique for Steerable Pyramid Image Transforms," Proc. Int'l Conf Acoustics Speech Signal Processing (ICASSP) IV, 1996, pp. 2387-2390.
Khabarlak et al., "Fast Facial Landmark Detection and Applications: A Survey," arXiv:2101.10808 (2021).
Smith et al., "Alpha and the History of Digital Compositing," Technical Memo 7, Microsoft Corporation, Aug. 15, 1995, 10 pages.
Wu et al, "Towards fitting a 3D dense facial model to a 2D image: A landmark-free approach", 8 pages.
Zou et al., "Object Detection in 20 Years: A Survey," arXiv: 1905.05055 May 16, 2019, 39 pages.
"Basics of Affine Transformation," Neutrium, https://neutrium.net/mathematics/basics-of-affine-transformation/ (2012).
Non-Final Office Action, mailed Dec. 7, 2023, U.S. Appl. No. 17/384,273, 12 pages.
Corrected Notice of Allowability, mailed Nov. 30, 2023, U.S. Appl. No. 17/384,357, 2 pages.
Corrected Notice of Allowability, mailed Dec. 13, 2023, U.S. Appl. No. 17/468,476, 2 pages.
Corrected Notice of Allowability, mailed Dec. 14, 2023, U.S. Appl. No. 17/468,511, 2 pages.
Supplemental Notice of Allowance, mailed Dec. 4, 2023, U.S. Appl. No. 17/468,546, 2 pages.
Kapusta et al., "Facial Appearance Modifications Using Skpca-derived Features Extracted From Convolutional Autoencoder's Latent Space", 2020 International Joint Conference on Neural Networks (IJCNN), (Jul. 1, 2020).
Notice of Allowance, mailed Oct. 12, 2023, U.S. Appl. No. 17/384,357, 9 pages.
Notice of Allowance mailed Oct. 6, 2023, U.S. Appl. No. 17/468,476, 9 pages.
Notice of Allowance mailed Nov. 2, 2023, U.S. Appl. No. 17/468,546, 10 pages.
Huang et al., "Arbitrary Style Transfer in Real-time with Adaptive Instance Normalization", Proceedings of the IEEE International Conference on Computer Vision, 2017, pp. 1501-1510.
Zhang et al., "The Unreasonable Effectiveness of Deep Features as a Perceptual Metric", Proceedings of the IEEE International Conference on Computer Vision, 2018, pp. 586-595, 10 pages.
Wiles et al., "Using Bottlenecks in Feedforward Networks as a Dimension Reduction Technique: An Application to Optimization Tasks", Neural Computation 8, 1996, pp. 1179-1183.
Tewari, et al. "StyleRig: Rigging StyleGAN for 3D Control over Portrait Images", arXiv:2004.0012v2, Jun. 13, 2020, 13 pages.
Wu et al, "Towards fitting a 3D dense facial model to a 2D image: A landmark-free approach", 2015 IEEE 7th International Conference on Biometrics Theory, Applications and Systems (BTAS), 2015, 8 pages.
U.S. Appl. No. 17/384,273 entitled "Identity Preserving Techniques for Generative Adversarial Network Projection", filed Jul. 23, 72 pages.
U.S. Appl. No. 17/384,357 entitled "Techniques for Domain To Domain Projection Using a Generative Model", filed Jul. 23, 2021, 72 pages.
U.S. Appl. No. 17/384,371 entitled "Direct Regression Encoder Architecture and Training", filed Jul. 23, 2021, 66 pages.
U.S. Appl. No. 17/384,378, entitled "Supervised Learning Techniques for Encoder Training", filed Jul. 23, 2021, 67 pages.
"A Stylemap-Based Generator for Real-Time Image Projection and Local Editing", ICLR 2021, 13 pages.
Abdal et al., "Image2StyleGAN: How to Embed Images Into the StyleGAN Latent Space?", arXiv:1904.03189v2 [cs.CV], Sep. 3, 2019, 23 pages.
Deng et al., "ArcFace: Additive Angular Margin Loss for Deep Face Recognition", arXiv:1801.07698v3 [cs.CV], Feb. 9, 2019, 11 pages.
Goodfellow et al., "Generative Adversarial Nets", arXiv: 1406.2661v1 [stat.ML], Jun. 10, 2014, 9 pages.
He et al., "Deep Residual Learning for Image Recognition", arXiv:1512.03385v1 [cs.CV], Dec. 10, 2015, 12 pages.
Huang et al., "Arbitrary Style Transfer in Real-time with Adaptive Instance Normalization", Department of Computer Science & Cornell Tech, Cornell University, 10 pages.
Karras et al., "Progressive Growing of GANs for Improved Quality, Stability, and Variation", ICLR, arXiv:1710.10196v3 [cs.NE], Feb. 26, 2018, pp. 26.
Karras et al., "Analyzing and Improving the Image Quality of StyleGAN", arXiv:1912.04958v2 [cs.CV], Mar. 23, 2020, 21 pages.
Karras et al., "A Style-Based Generator Architecture for Generative Adversarial Networks", arXiv:1812.04948v3 [cs.NE], Mar. 29, 2019, 12 pages.
Pidhorskyi et al., "Adversarial Latent Autoencoders", arXiv:2004.04467v1 [cs.LG], Apr. 9, 2020, 10 pages.

(56) References Cited

OTHER PUBLICATIONS

Rajarapollu et al., "Bicubic Interpolation Algorithm Implementation for Image Appearance Enhancement" IJCST vol. 8, Issue 2, Apr.-Jun. 2017, 4 pages.
Shen et al., "InterFaceGAN: Interpreting the Disentangled Face Representation Learned by GANs", arXiv:2005.09635v2 [cs.CV], Oct. 29, 2020, 16 pages.
Simonyan et al., "Very Deep Convolutional Networks for Large-Scale Image Recognition", arxiv:1409.1556v6 [cs.CV], Apr. 10, 2015, 14 pages.
Zhang et al., "The Unreasonable Effectiveness of Deep Features as a Perceptual Metric", pp. 586-595, 10 pages.
Zhu et al., "Generative Visual Manipulation on the Natural Image Manifold", arXiv:1609.03552v2 [cs.CV], Sep. 25, 2016, 16 pages.
Zhu et al., "In-Domain GAN Inversion for Real Image Editing", arXiv:2004.00049v3 [cs.CV], Jul. 16, 2020, 31 pages.
U.S. Appl. No. 17/468,487, "Notice of Allowance", Mar. 6, 2024, 14 pages.
U.S. Appl. No. 17/468,511, "Corrected Notice of Allowability", Jan. 12, 2024, 2 pages.
U.S. Appl. No. 17/468,546, "Supplemental Notice of Allowability", Jan. 18, 2024, 2 pages.
Brock et al., "Neural Photo Editing with Introspective Adversarial Networks", Published as a conference paper at ICLR 2017, 2017, 15 pages.
Heinrich, "Photo Editing with Generative Adversarial Network (Part 2)", Available Online at: https://developer.nvidia.com/blog/photo-editing-generative-adversarial-networks-2/, Apr. 24, 2017, 8 pages.
U.S. Appl. No. 17/384,273, "Final Office Action", Mar. 26, 2024, 16 pages.
U.S. Appl. No. 17/384,283, "Final Office Action", Mar. 26, 2024, 20 pages.
U.S. Appl. No. 17/468,487, "Notice of Allowability", Apr. 11, 2024, 11 pages.
U.S. Appl. No. 17/468,487, "Notice of Allowability", Apr. 3, 2024, 11 pages.
Hou et al., "Deep Feature Similarity for Generative Adversarial Networks", 4th International Association for Pattern Recognition Asian Conference on Pattern Recognition (ACPR), Nov. 2017, pp. 115-119.
Advisory Action, mailed Jul. 5, 2024, U.S. Appl. No. 17/384,273, 5 pages.
Non-Final Office Action, mailed Aug. 28, 2024, U.S. Appl. No. 17/384,273, 14 pages.
Non-Final Office Action, mailed Oct. 21, 2024, U.S. Appl. No. 17/384,371, 31 pages.
Non-Final Office Action, mailed Dec. 6, 2024, U.S. Appl. No. 17/384,378, 28 pages.
Li et al., "Facial Attribute Editing by Latent Space Adversarial Variational Autoencoders", 2018 24th International Conference on Pattern Recognition (ICPR), Aug. 20-24, 2018,.
Mardani et al., "Deep Generative Adversarial Neural Networks for Compressive Sensing MRI", vol. 38, No. 1, Institute of Electrical and Electronics Engineers Transactions on Medical Imaging, Jan. 2019, 31 pages.
Wang et al., "Enhancing HEVC Spatial Prediction by Context-based Learning", ICASSP 2019—2019 Institute of Electrical and Electronics Engineers International Conference on Acoustics, Speech and Signal Processing (ICASSP), May 12-17, 2019, 6 pages.
Final Office Action, mailed Feb. 12, 2025, U.S. Appl. No. 17/384,273, 17 pages.
Notice of Allowance, mailed Feb. 26, 2025, U.S. Appl. No. 17/384,371, 13 pages.
Corrected Notice of Allowability, mailed Mar. 26, 2025, U.S. Appl. No. 17/384,283, 2 pages.
Non-Final Office Action, mailed Mar. 26, 2025, U.S. Appl. No. 17/468,498, 29 pages.
Gulrajani et al., "Improved Training of Wasserstein GANs", Proceedings of the 31st International Conference on Neural Information Processing Systems, Dec. 4, 2017, pp. 1-11.
Jadon, "A Survey of Loss Functions for Semantic Segmentation", Available Online at: https://arxiv.org/abs/2006.14822, Sep. 3, 2020, 6 pages.
Kramer et al., "InterFace: A Software Package for Face Image Warping, Averaging, and Principal Components Analysis", Behavior Research Methods, vol. 49, Dec. 7, 2016, pp. 2002-2011.
Vanrullen et al., "Reconstructing Faces from fMRI Patterns using Deep Generative Neural Networks", Communications Biology, vol. 2, No. 193, May 21, 2019, pp. 1-10.

\* cited by examiner

MULTI-SCALE OUTPUT TECHNIQUES FOR GENERATIVE ADVERSARIAL NETWORKS

CROSS-REFERENCE TO RELATED APPLICATIONS

This application is a non-provisional application of and claims the benefit of the filing date of U.S. Provisional Application 63/092,980, filed on Oct. 16, 2020, which is herein incorporated by reference in its entirety for all purposes.

This application is related to the concurrently filed applications titled "Identity-Perserving Techniques for Generative Adversarial Network Projection" and "Techniques for Domain-to-Domain Projection Using a Generative Model," which are herein incorporated by reference in their entirety for all purposes.

This application is also related to the concurrently filed applications titled "Direct Regression Encoder Architecture and Training" and "Supervised Learning Techniques for Encoder Traininig," which are herein incorporated by reference in their entirety for all purposes.

TECHNICAL FIELD

This disclosure generally relates to image editing techniques. More specifically, but not by way of limitation, this disclosure describes an improved system architecture that uses a pipeline including an encoder and a Generative Adversarial Network (GAN) to generate edited images with improved speed, realism, and identity preservation.

BACKGROUND

Many image editing tools provide features that enable a user to edit or modify an image. Some of these tools even use machine learning-based techniques for editing images. However, the image editing capabilities of such existing tools are quite limited—the recreation of images is not accurate, the editing is limited to low-resolution images (e.g., 256×256 pixels) (i.e., large high resolution images cannot be processed at all or cannot be processed in a reasonable time frame for the desired end result), unwanted artifacts and effects are introduced into the recreated images, and other deficiencies.

Some image editing tools use machine learning models such as Generative Adversarial Networks (GANs) to generate edited images. While GANs have been successful in generating high quality edited images, existing techniques using GANs still have several shortcomings. For example, some systems use an optimization process to generate an editable representation of an image. Generally the optimization process can take several minutes and thus real-time results cannot be provided. Further, in prior systems, the image generated tends to diverge from the original. This divergence can take multiple forms and can impact multiple features of the content of the input image (e.g., for an image of a face being edited, in the edited generated image, the teeth or nose looks different than from in the original image). The techniques described herein address these problems and others.

SUMMARY

The present disclosure describes techniques for editing images to efficiently generate realistic and accurate edited images. More particularly, new and improved techniques are described for using a Generative Adversarial Network (GAN) including a specialized generator neural network to generate multiple resolution output images.

In some embodiments, a computer-implemented method includes producing a latent space representation of an input image; generating a first output image at a first resolution by providing the latent space representation of the input image as input to a generator neural network comprising an input layer, an output layer, and a plurality of intermediate layers and taking the first output image from an intermediate layer, of the plurality of intermediate layers of the generator neural network; and generating a second output image at a second resolution different from the first resolution by providing the latent space representation of the input image as input to the generator neural network and taking the second output image from the output layer of the generator neural network.

In some aspects, the method further includes outputting the first output image and the second output image for display on a computing device. In some aspects, the intermediate layer of the generator neural network is coupled to a second neural network; and the first output image is output via the second neural network. In some aspects, the input image has a third resolution, and the method further includes training the second neural network by generating a training image with a fourth resolution less than the third resolution; extracting features from the intermediate layer of the generator neural network; and minimizing a loss between the training image and the extracted features from the intermediate layer.

In some aspects, the intermediate layer is a first intermediate layer, and the method further includes generating a third output image at a fifth resolution different from the first resolution and the second resolution by providing the latent space representation of the input image as input to the generator neural network and taking the third output image from a second intermediate layer, of the plurality of intermediate layers of the generator neural network. In some aspects, the first resolution is lower than the second resolution and the first intermediate layer is closer to the input layer than the second intermediate layer. In some aspects, the first output image is generated in less than about five seconds after obtaining the input image.

In some embodiments, a computing system includes a processor and a non-transitory computer-readable medium comprising instructions which, when executed by the processor, perform processing including producing a latent space representation of an input image; generating a first output image at a first resolution by providing the latent space representation of the input image as input to a generator neural network comprising an input layer, an output layer, and a plurality of intermediate layers and taking the first output image from an intermediate layer, of the plurality of intermediate layers of the generator neural network; and generating a second output image at a second resolution different from the first resolution by providing the latent space representation of the input image as input to the generator neural network and taking the second output image from the output layer of the generator neural network.

In some embodiments, a non-transitory computer-readable medium has instructions stored thereon, the instructions executable by a processing device to perform operations including generating a latent space representation of an input image; a step for generating a first output image at a first resolution using an intermediate layer of a generator neural network; and step for generating a second output image at a second resolution different from the first resolution using an output layer of the generator neural network.

Various embodiments are described herein, including methods, systems, non-transitory computer-readable storage media storing programs, code, or instructions executable by one or more processors, and the like.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
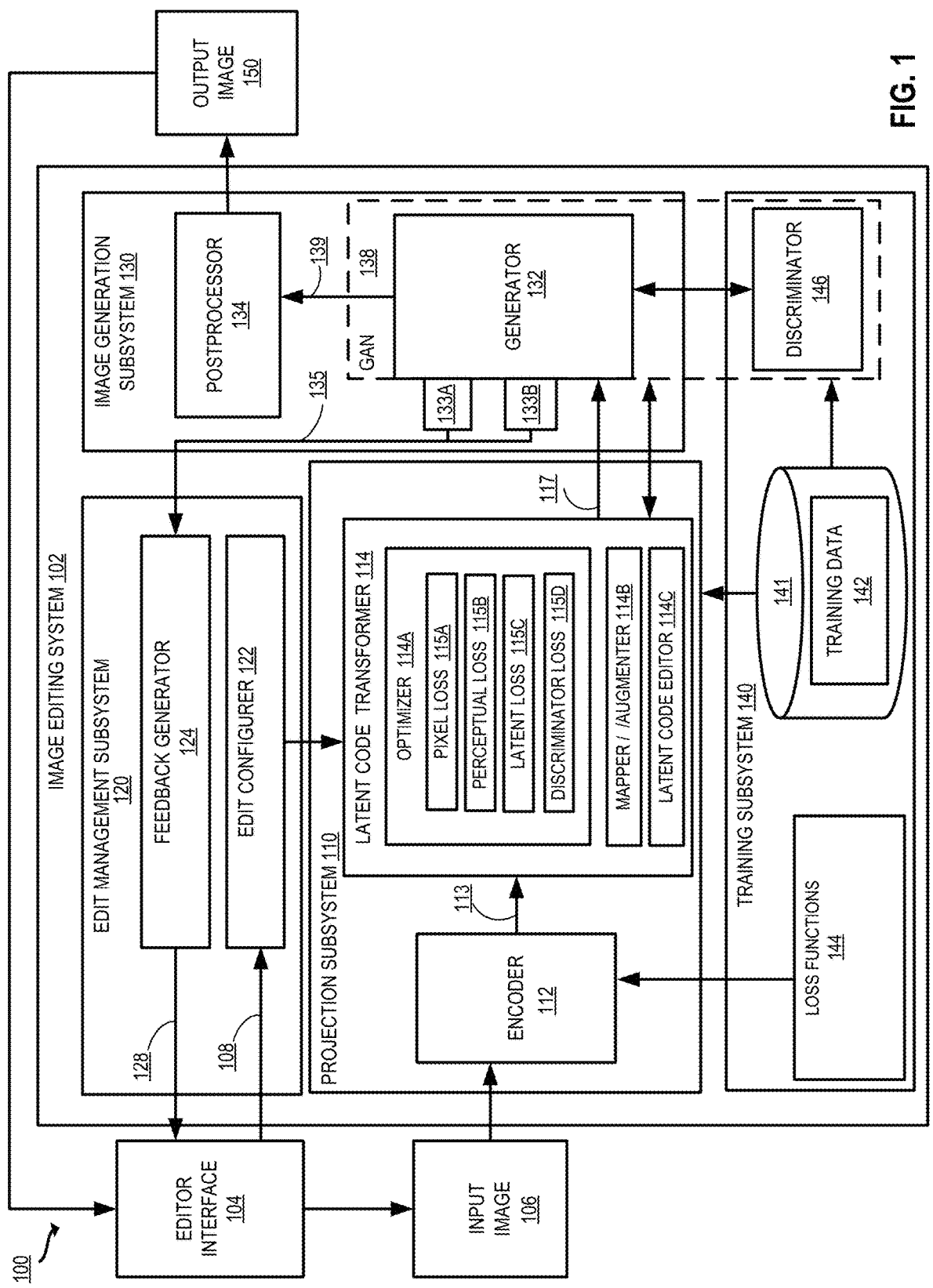
FIG. 1 depicts an example of a computing environment for image editing according to certain embodiments of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

In certain embodiments, the disclosed techniques include new and improved machine learning-based techniques such as using a generator neural network (e.g., part of a GAN) to efficiently generate realistic and accurate images. To edit images with a generator neural network, a latent space representation z is discovered such that the image G(z) generated by the generator neural network is similar to a user-specified image x. This process of discovering a latent space representation corresponding to a user-specified image is called projection. The latent space may, for example, be a hypersphere made up of variables drawn from a Gaussian distribution. In a training process, the generator neural network learns to map points in the latent space to specific output images. Such interpretation by the generator neural network gives structure to the latent space, which varies according to the generator used. For a given generator neural network, the latent space structure can be analyzed and traversed to control image generation.

As noted above, various machine learning models are popularly used to generate and edit realistic images. In particular, GANs can be used to generate an image, either randomly or based on a real image. In existing systems, there exists a trade-off between speed and accuracy. With conventional systems, at best it takes several minutes to generate an image that looks realistic and replicates the original image. Generally, those systems that can deliver faster results do so with reduced accuracy and/or resolution. For a compelling user experience, the projection process should not only discover a latent space representation which accurately reconstructs a user-specified image, but it also should be efficiently computed within several seconds. Thus, a major problem is finding a projection process that is efficient and accurate. Prior techniques suffer from one or more of the following:

Inefficient. The projection should be done in seconds for a compelling user experience, whereas high-resolution projection typically takes about 5 minutes.

Does not maintain identity. For example, when projecting an image of a person's face, the person's identity will change making the output unusable for editing.

Low-resolution images are produced.

Require noise maps which cannot be cheaply transmitted across networks in large-scale products.

Require retraining the generative model.

The present disclosure describes techniques for image generation and editing that address the above-noted deficiencies. In some aspects, a latent space representation of an input image is optimized both quickly and with high resolution while providing accurate results including identity preservation. This latent space representation of the input image may be edited (e.g., editing a face image to make the person depicted appear to smile or wear glasses). The edited latent space representation is processed using a generator neural network to generate an image that replicates the input image with improved speed, realism, and identity preservation. In some embodiments, an input image is processed by a pipeline of an image editing system including an encoder and generator. The encoder processes the input image to produce a latent space representation of the input image. The latent space representation of the input image is optimized by minimizing a loss based on perceptual features extracted from the input image and perceptual features extracted from the initial latent space representation of the input image. In alternative or additional embodiments, a discriminator loss component is added to the loss to constrain the output image towards a particular image domain or style (e.g., to edit an input cartoon image to appear like a photorealistic image). In alternative or additional embodiments, the generator neural network is modified with auxiliary networks that produce rapid preview images.

The following non-limiting examples are provided to introduce certain embodiments. In these examples, an image editing system projects an image into the latent space of a GAN, resulting in a latent space representation (e.g., an N-dimensional vector or matrix representation) of the image. This latent space representation can be edited (e.g., using vector addition or other techniques). When the edited latent space representation is processed with the GAN to generate an output image, the edits are reflected in the output image. For example, an image of a human face can be edited so that the face appears to smile, look older or younger, turn the head to a different angle, and so forth.

In a first example, the image editing system applies techniques for generating an image based on an optimized latent space representation of an input image while maintaining speed, resolution, and similarity to the input image. First, the image editing system obtains an input image. For example, a user uploads an image to image editing software. The image editing system produces an initial latent space representation of the input image by encoding the input image. For example, the downsampled input image is processed by an encoder neural network trained to generate a latent space representation of an input image.

The initial latent space representation is processed with a generator neural network to generate an initial output image. The initial latent space representation is provided as input to a generator neural network, which has been pretrained to generate images from latent space representations of images. This results in an initial output image. Due to the nature of the initial latent space representation of the input image, this initial latent space representation, when used to generate an output image, may produce an output image that does not look adequately similar to the input image. Accordingly, the initial latent space representation is then optimized.

To optimize the latent space representation, the image editing system applies a loss minimization technique that minimizes a loss between the input image and the initial output image. The image editing system computes a loss based on target perceptual features extracted from the input image and initial perceptual features extracted from the initial output image. Perceptual features are visually representable properties of objects. Examples of perceptual features include size, shape, color, position, facial expression, and so forth. To extract perceptual features, for example, the image editing system provides the images as input to a convolutional neural network trained to classify images, and extracts features from selected layers of the convolutional neural network. The output of these layers can be correlated to different perceptual features in an image. These perceptual features are compared, for the initial input image and the output image, to compute the loss.

The image editing system minimizes the loss to generate an optimized latent space representation of the input image. The image editing system adjusts the latent space representation to minimize the loss. This may be performed iteratively, e.g., by generating updated images using the updated latent space representations, extracting perceptual features from the updated images, and recomputing the loss function, which is then used to adjust the latent space representation repeatedly until convergence.

Once the latent space representation of the input image is optimized, the image editing system outputs the optimized latent space representation of the input image for downstream use. The downstream use may include editing the latent space representation (e.g., so that the output image will look different such as a face looking older or a couch having a different shape). Alternatively, or additionally, the downstream use may include processing the optimized latent space representation with the generator neural network to generate an output image that is perceptually similar to the input image. This process can be used to project and generate an output image that is perceptually similar to the input image in less than ten seconds.

In another example, the image editing system generates preview images using a modified generator neural network. The image editing system produces a latent space representation of an input image. For example, the image editing system uses an encoder to generate the latent space representation, as described above with respect to the first example. The image editing system generates a first output image at a first resolution by providing the latent space representation of the input image as input to a generator neural network. The generator neural network includes an input layer, an output layer, and multiple intermediate layers. The first output image is taken from one of the intermediate layers. In some implementations, the generator neural network is augmented with an auxiliary neural network trained to generate the first output image from the intermediate layer.

The image editing system generates a second output image at a second resolution different from the first resolution by providing the latent space representation of the input image as input to the generator neural network and taking the second input image from the output layer of the generator neural network. This generates another, higher resolution output image.

In some implementations, the first output image is used as a preview image (e.g., for display on a user interface while further processing is performed. Such a preview image can be generated quickly (e.g., in a few seconds), as the image need not be processed by the whole generator neural network. Although the preview image is lower resolution than the final output, the preview image is an accurate representation of that ultimate output. Such use of a specialized neural network to generate preview images is particularly useful for image editing software when there may be a very high resolution image being generated that can take 8 or more seconds or even minutes to optimize, as the preview image can be generated in less than five seconds and shown to the user during processing.

In another example, the image editing system uses an optimization technique to modify a latent space representation of an input image in a first domain, such that the ultimate output image is in a second target domain. The domains correspond to categories or styles of images. For example, the first domain is cartoons of people and the second domain is photorealistic images of people. A cartoon image of a person is used to generate a photorealistic image of a person that looks similar to the cartoon image. As another example, the first domain is a photograph of a landscape and the second domain is a painting of a landscape. A photograph of a landscape is used to generate an image in the style of a landscape painting style image that looks similar to the landscape photograph.

The image editing system uses a pipeline including an encoder and a GAN comprising a generator neural network and a discriminator neural network. The image editing system obtains a first image in a first domain (e.g., a photograph of a person, a sketch, a collage, and so forth). For the purposes of this example, the input image is a sketch of a face (e.g., the first domain is "sketch") and the target domain is "photorealistic image." In this case, the objective is to enforce realism in the latent space representation of the input image. This is accomplished using a GAN which has been pretrained to generate photorealistic images of faces. Such a GAN includes a generator neural network that was trained to generate photorealistic images of faces and a discriminator neural network that was trained to recognize whether or not an image is a photorealistic image of a face (e.g., as opposed to a computer-generated image of a face).

The image editing system produces an initial latent space representation of the input image by encoding the input image, as described above with respect to the first example. Similarly to the first example, the image editing system minimizes a loss to update the initial latent space representation. In this case, the loss is based on output of the discriminator. Since the discriminator is trained to recognize whether an image is in a particular domain (e.g., that of photorealistic images), a score generated by the discriminator is used to guide the latent space representation toward the target domain.

The image editing system identifies information about a target domain. For example, a target latent code is selected according to user preference and/or by selecting the mean latent code from GAN training. The target latent code is provided as input to the generator neural network, which outputs a target image. The target image is then processed by the discriminator neural network to compute a target output of the discriminator neural network.

The image editing system generates an initial output image by processing the initial latent space representation of the input image with the generator neural network. This initial output image is provided as input to the discriminator neural network. The discriminator neural network outputs a score indicating whether the initial output image is in the target domain. For example, a discriminator trained on digital photographs of human faces may output a score such as 1 or 100 if the image looks exactly like a photograph of a human face, and a score such as 0 or 50 if the image does not look like a photograph of a human face or looks somewhat like a photograph of a human face.

The image editing system computes a loss based on the computed score. The loss may be based on the target discriminator output, the computed score, and possibly other loss components, such as the perceptual loss described above with respect to the first example. The image editing system minimizes the loss to compute an updated latent space representation of the input image. Since the discriminator was trained to evaluate whether a generated image looks like a photorealistic image of a human face, minimizing the discriminator loss constrains the latent space representation towards the domain of photorealistic images of human faces.

Upon computing the updated latent space representation, the image editing system processes the optimized latent space representation with the generator neural network to generate an output image that is in the target domain of photorealistic images of faces. Although this example relates to the domain of realistic face images, these techniques are suitable for a wide range of applications, such as converting a photograph of a dog to a cartoon, converting an image of a sculpture of a person to a drawing of a person, and so forth.

Accordingly, as described herein, certain embodiments provide improvements to computing environments by solving problems that are specific to computer-implemented image editing environments. These improvements include projecting an image into the latent space with improved speed, resolution, and resemblance to the input image. Further improvements can be provided, alternatively or additionally, by modifying the generator neural network to quickly output one or more preview images via an auxiliary neural network, which can be used to generate a quick preview image. Further improvements can be provided, alternatively or additionally, by minimizing a loss based on a discriminator output to project an image from one domain to another. Together or separately, these techniques significantly improve the results and user experience of GAN projection.

Example of an Operating Environment for Image Projection and Editing

FIG. 1 depicts an example of a computing environment 100 including an image editing system 102 that provides capabilities for editing electronic content such as digital photos and images. For example, as depicted in FIG. 1, the image editing system 102 may receive as inputs an input image 106 that is to be edited and one or more edits to be made to the input image 106. The image editing system 102 is configured to edit the input image 106 per the edits and generate an output image 150 that is an edited representation of the input image 106 and incorporates the edits.

There are various ways in which the input image 106 and the edits to be made are input to the image editing system 102. In the example depicted in FIG. 1, the image editing system 102 may provide an editor interface 104 that a user may use to provide inputs regarding the input image 106 to be edited and the one or more edits (e.g., edit parameters 108 to be made to the input image 106). The image editing system 102 then generates an edited output image 150 by applying the user-provided edits to the input image 106. In certain embodiments, the edited output image 150 may be presented or output to the user using the editor interface 104.

In some embodiments, the editor interface 104 may include one or Graphical User interfaces (GUIs) that enable a user to provide inputs identifying the input images, identifying the edits to be made to be made, setting configuration parameters for the image editing system 102, and the like. For example, a GUI may include one or more user-selectable elements that enable a user to input images 106 to be edited. One or more GUIs provided by the editor interface 104 may include one or more upload elements for uploading content (e.g., an upload field to upload an image to be edited). In some implementations, the editor interface 104 responds to user selection of an upload element by transitioning to a view showing available files to upload, prompt a user to take a photo, or the like.

One or more GUIs provided by the editor interface 104 may also include user-selectable elements that enable a user to specify the edits or modifications to be performed. For example, a GUI may display one or more sliders that can be manipulated by the user, each slider corresponding to an attribute of the image to be edited. Other elements provided by the GUIs may include text entry fields, buttons, pull-down menus, and other user-selectable options. In certain implementations, the editor interface 104 may be part of a content editing software such as Adobe Photoshop®, which is capable of receiving and editing digital content (e.g., digital photographs or other images).

Figure 15:
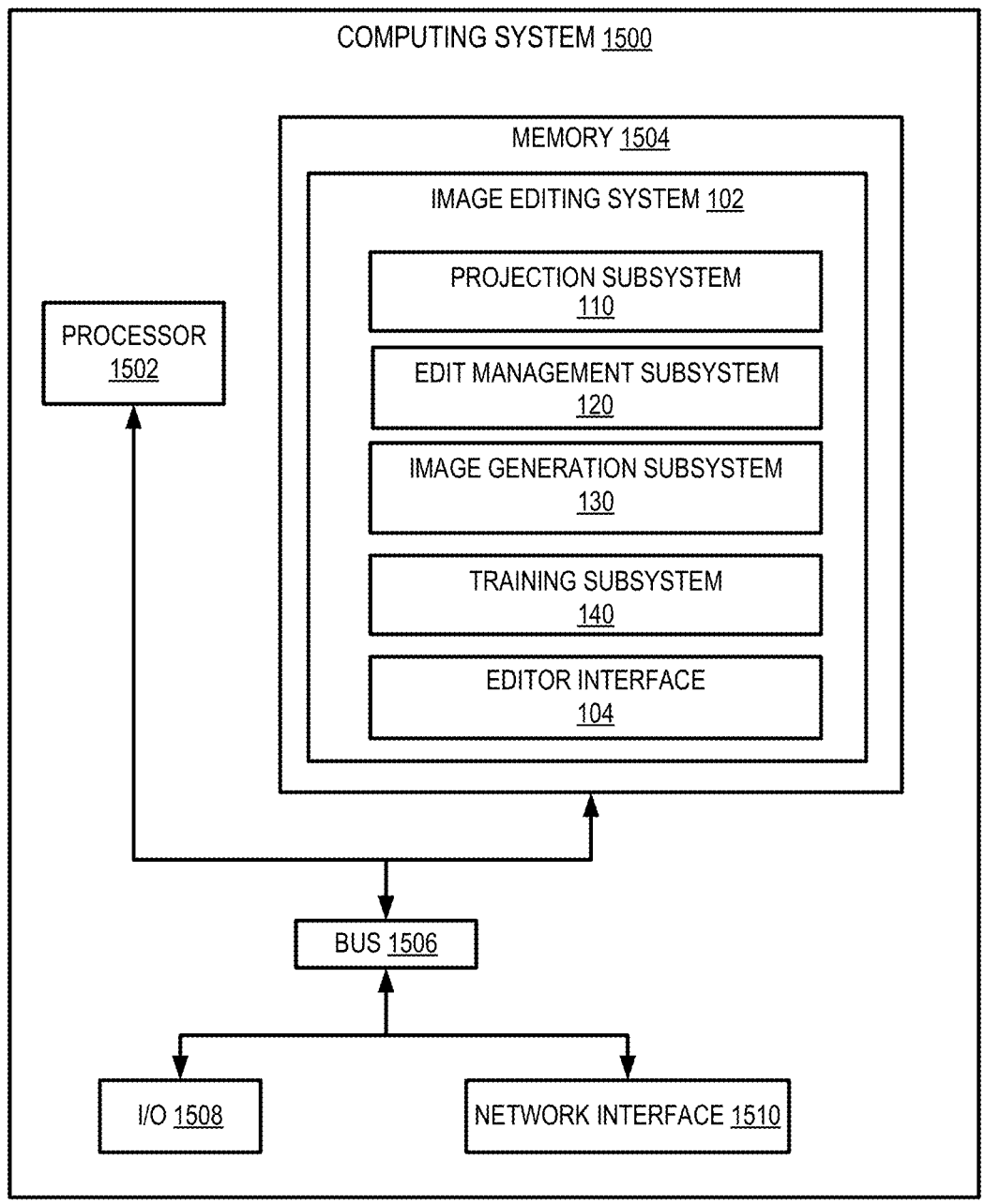
FIG. 15 depicts an example of a computing system that performs certain operations described herein according to certain embodiments of the present disclosure.
Figure 16:
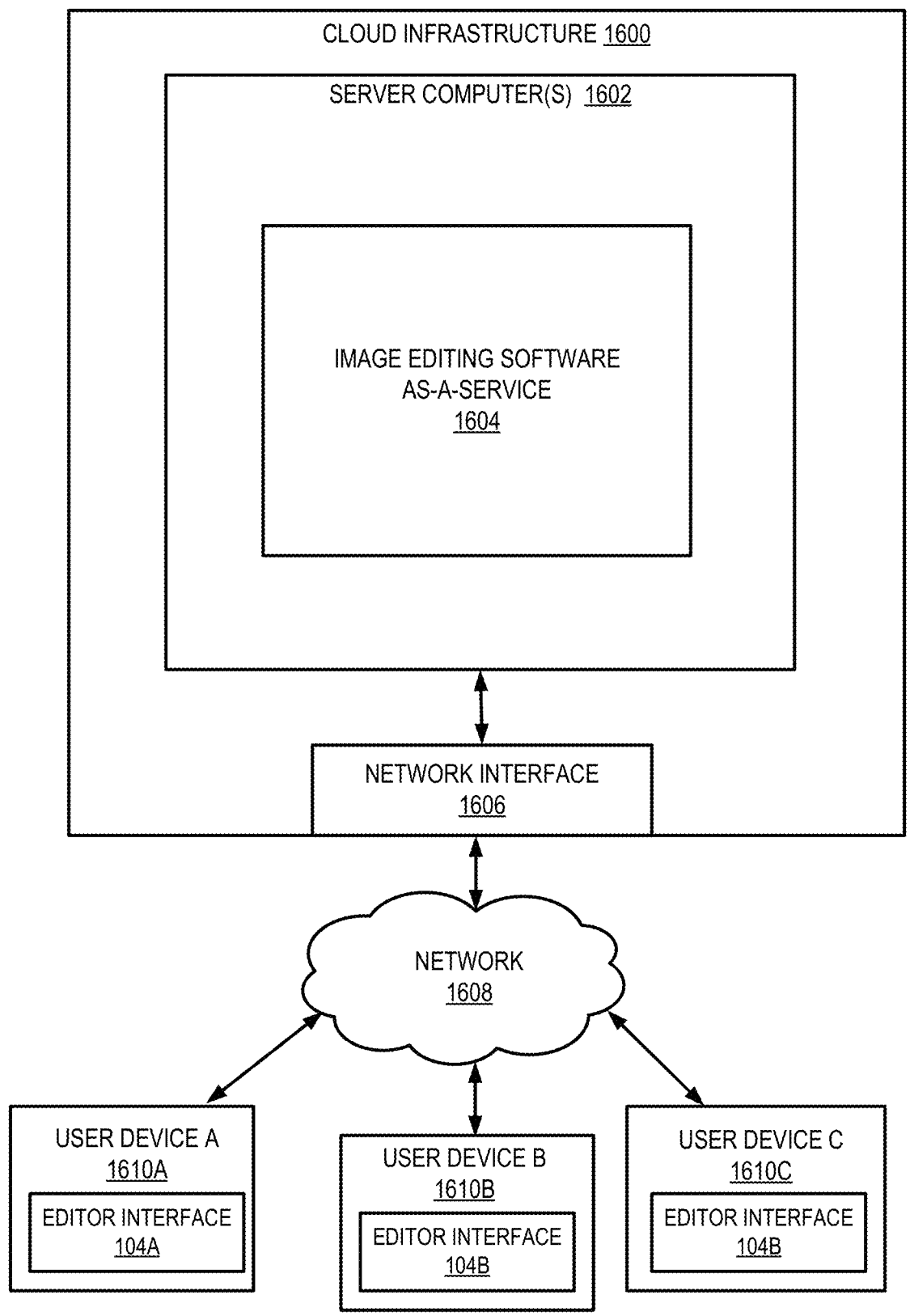
FIG. 16 depicts an example of a cloud computing environment that performs certain operations described herein according to certain embodiments of the present disclosure.

In some embodiments, the image editing system 102 and the editor interface 104 execute on a computing device, which may be used by a user. Examples of a computing device include, but are not limited to, a personal computer, a tablet computer, a desktop computer, a processing unit, any combination of these devices, or any other suitable device having one or more processors. In some other embodiments, the image editing system 102 and the editor interface 104 may operate on different computing systems, which may be communicatively coupled to each other. Examples of computer platform and implementations that may be used to implement the image editing system 102 are depicted in FIGS. 15 and 16 and described below.

The image editing system 102 may include multiple subsystems, which work in cooperation to generate edited output images 150. In the embodiment depicted in FIG. 1, the image editing system 102 includes a projection subsystem 110, a training subsystem 140, an edit management subsystem 120, and an image generation subsystem 130. Computing environment 100 depicted in FIG. 1 is merely an example and is not intended to unduly limit the scope of claimed embodiments. Many variations, alternatives, and modifications are possible. For example, in some implementations, the image editing system 102 may have more or fewer subsystems than those shown in FIG. 1, may combine two or more subsystems, or may have a different configuration or arrangement of subsystems. The various systems, subsystems, and other components depicted in FIG. 1 may be implemented in software (e.g., code, instructions, program) only executed by one or more processing units (e.g., processors, cores) of the respective systems, using hardware only, or combinations thereof. The software may be stored on a non-transitory storage medium (e.g., on a memory device).

The various subsystems of the image editing system 102 can be implemented in the same computing system or different, independently operated computing systems. For example, the edit management subsystem 120 could be a separate entity from the projection subsystem 110, the image generation subsystem 130, and the training subsystem 140, or the same entity. The image editing system 102 may execute on a server separately from the editor interface 104, or other embodiments can involve the image editing system 102 being built into a software application executing the editor interface 104 on a user device.

One or more of the subsystems of the image editing system 102 include trained machine learning models or include components that use machine learning models that have been trained. For example, in the embodiment depicted in FIG. 1, the training may be performed by a training subsystem 140, which may perform the training using various training data 142. In some implementations, the training subsystem 140 includes, or is communicatively coupled to, one or more data storage units 141 for storing the training data 142.

An edit management subsystem 120 configures edits to the input image 106 using an edit configurer 122 and a feedback generator 124. A projection subsystem 110 generates a latent space representation 113 representing the input image 106. A latent code transformer 114 generates a modified latent space representation 117 by applying one or more transformations, including the edits configured by the edit management subsystem 120, to the latent space representation 113 of the input image. An image generation subsystem 130 includes a generator 132 that generates an image according to the transformed latent space representation 117. In some aspects, the image generation subsystem 130 further includes a postprocessor 134 that performs postprocessing of the generated image 139 to produce the output image 150, which may be returned to the editor interface 104. In some embodiments, the training subsystem 140 trains one or more components of the latent code transformer 114 using the training data 142. In some implementations, the training subsystem 140 trains the generator 132 using a discriminator 146. In some implementations, the training subsystem 140 trains the encoder 112 and/or components of the latent code transformer 114 using one or more loss functions 144.

The edit management subsystem 120 includes hardware and/or software configured to control image edits. The edit management subsystem 120 includes an edit configurer 122 and a feedback generator 124. The edit configurer 122 receives edit parameters 108, e.g., editor-configured modification instructions, from the editor interface 104. For example, edit parameters 108 may specify that an image of a person should be modified to include red hair and glasses. The edit configurer 122 transmits an indication of the edit parameters 108 to the latent code transformer 114 of the projection subsystem 110 for further processing.

The feedback generator 124 prepares and transmits edit feedback 128 to the editor interface 104. Examples of such edit feedback 128 includes metrics showing how much an attribute is being modified (e.g., numerical values showing the selected edit parameters 108). Alternatively, or additionally, the edit feedback 128 includes preview images showing how the output image will appear given the current edit parameters. In some embodiments, the feedback generator 124 receives reduced-resolution preview images 135 from auxiliary networks 133A, 133B of the GAN 138, as described herein. The feedback generator 124 uses the reduced-resolution preview images 135 to provide a quick preview image to the editor interface 104.

The projection subsystem 110 includes hardware and/or software configured to identify and transform latent space representations of images. The projection subsystem 110 receives as input the input image 106 and generates as output a modified latent space representation of the input image 117, which is a vector string of numbers reflecting edits to be applied to the input image 106.

In some implementations, the projection subsystem 110 includes an encoder 112 configured to receive an input image 106, project the input image 106 into a latent space representation 113, and output the latent space representation 113. The projection subsystem 110 further includes and a latent code transformer 114 for performing transformations and other modifications to the latent space representation 113 to generate a modified latent space representation 117.

In some implementations, the encoder 112 is a machine learning model that has been trained to discover a latent space representation of the input image 106. The latent space representation (also referred to as semantic latent code or latent code) is a string of numbers (e.g., a n-dimensional vector, containing a value for each of the n-dimensions) that, when provided as input to the generator, creates a particular image (e.g., to replicate the input image 106). The encoder 112 is a machine learning model trained to generate such a latent space representation. The encoder 112 may, for example, be a feed forward network trained to encode the input image 106. Given an input image 106 and a generator 132, the encoder discovers a latent space representation of the input image z, such that when the latent space representation of the input image z is input to the generator 132, the resulting generated image 139 perceptually resembles the target input image 106.

The latent code transformer 114 includes functionality to optimize, transform, and/or edit the latent space representation 113 and/or an initial latent code to generate the modified latent space representation 117. Such transformations may include modifications received from the edit management subsystem 120. Alternatively, or additionally, the transformations include mappings to make the latent code more easily editable or more easily digestible by the generator 132. The transformations further include an optimization process performed by the optimizer 114A to increase the similarity between the latent space representation and the original input image 106. The latent code transformer 114 outputs the transformed latent space representation 117 to the generator 132 for further processing. In some aspects, the latent code transformer 114 includes an optimizer 114A, a mapper/augmenter 114B, and a latent code editor 114C.

The optimizer 114A includes functionality to optimize the latent space representation of an input image. In some aspects, the optimizer 114A takes an initial latent space representation and optimizes the latent space representation according to one or more loss functions. The loss is minimized until the transformed latent space representation 117 is perceptually similar to the input image 106 to a desired degree. In some implementations, the loss function further includes components for controlling qualities of the latent space representation such as realism constraint. The optimizer 114A can use a combination of loss components including a pixel loss 115A, perceptual loss 115B, latent loss 115C, and discriminator loss 115D to optimize and/or control the latent space representation, as described herein.

The pixel loss 115A is a function of pixels of the input image and pixels of an image generated from the initial latent space representation. Minimizing the pixel loss 115A steers the latent space representation to produce images similar to the input image on a pixel-by-pixel basis. The perceptual loss 115B is a function of perceptual features extracted from the input image, and perceptual features of an image generated from the initial latent space representation. Minimizing the perceptual loss 115B steers the latent space representation to produce images similar to the input image according to high level or low level perceptual features. For example, different layers of a convolutional neural network can be used to extract high-level or low-level features for comparison.

The latent loss 115C is a function of a latent space representation of the input image and a target latent code. Minimizing the latent loss 115C can be used to steer the latent space representation towards greater similarity with the input image. The discriminator loss 115D is a function of a discriminator output generated using the latent space representation of the input image and a target discriminator output. Minimizing the discriminator loss 115D can be used to steer the latent space representation to produce images in the domain in which the discriminator was trained (e.g., to enforce realism or change a photo to a sketch, as described herein).

The mapper/augmenter 114B includes functionality to map the latent space representation 113 from one latent space to another. For example, the encoder 112 generates a latent code in a first space, Z space, and the mapper/augmenter 114B applies a mapping to transform the latent code from the Z space to a second space, W space. This mapping is executed in some implementations to facilitate image editing by transforming the latent space such that movement in the latent space smoothly correlates with changes to one or more target attributes. As an example, in the W space, incrementing the latent variable in a particular direction continuously makes hair color lighter in an image while maintaining the overall look of the image. In the Z space, such smooth changes with direction in the latent space are not always possible, as the Z space is more "entangled." W space transformation techniques and advantages are described in Karras et al., "A Style-Based Generator Architecture for Generative Adversarial Networks", https://arxiv.org/pdf/1812.04948.pdf (2019) ("StyleGAN") and Shen et al., InterFaceGAN: Interpreting the Disentangled Face Representation Learned by GANs, arXiv: 2005.09635 (2020).

In some implementations, the mapper/augmenter 114B further includes functionality to augment the latent space representation 113 from one dimensionality to another (e.g., to an extended latent space, also referred to as "W-plus" or "$W_p$" space). For example, the mapper/augmenter 114B transforms W space latent code, which is 512 dimensions, to $W_p$ space latent code, which is 512×18 dimensions. This facilitates image editing based on continuous properties of the latent space. $W_p$ space transformation techniques and advantages are described in Abdal et. al., "Image2StyleGAN: How to Embed Images Into the StyleGAN Latent Space?," arXiv: 1904.03189 (2019).

The latent code editor 114C applies changes to the latent space representation 113 (e.g., after optimization performed by the optimizer 114A and any mappings or augmentations performed by the mapper/augmenter 114B), based upon edit parameters received from the edit configurer. For example, the latent code editor 114C applies linear and/or nonlinear modifications to the latent space representation based on training indicating that these modifications will cause a desired change in the ultimate output image (e.g., to make a person depicted in an image appear to smile, be older, etc.).

Thus, the latent space representation 113 generated by the encoder 112 is processed by one or more components of the latent code transformer 114 to generate the modified latent space representation 117, which is passed to the image generation subsystem 130 for further processing.

In some embodiments, the image generation subsystem 130 includes hardware and/or software configured to generate an output image 150 based on input code (e.g., the modified latent space representation 117). The image generation subsystem includes a generator 132 and a postprocessor 134.

The generator 132 includes a machine learning model which has been trained to generate a generated image 139 based on input latent code. In some implementations, the generator 132 is a neural network. The generator 132 is pretrained to generate data that is similar to a training set. Depending on the type of image to be edited by the image editing system 102, the generator may be trained to generate an image of a human face, a landscape, a dog, a cat, a shoe, and so forth. In some aspects, the generator 132 is trained to generate a specific type of image, as such targeted training can produce very realistic results. The generator 132 can produce a random new image (e.g., of a person that does not exist) based on random input (e.g., from a normal or Gaussian distribution). The generator can produce a new image that looks like an input image 106 using the techniques described herein and an input latent space representation of an image that is generated based on the input image 106. In some implementations, the generator 132 is part of a Generative Adversarial Network (GAN) 138, and is trained in a zero-sum game with the discriminator 145.

In some embodiments, the generator 132 is attached to one or more auxiliary networks 133A, 133B. Although two auxiliary networks 133A and 133B are pictured, more or fewer auxiliary networks may be implemented. The auxiliary networks 133A and 133B are neural networks attached to selected layers of the generator 132. The auxiliary networks 133A and 133B are trained to output a reduced-resolution version of the ultimate GAN output 139 using intermediate feature vectors extracted from the intermediate layers of the generator 132. These reduced-resolution preview images 135 are transmitted to the feedback generator 124 for further processing.

In some embodiments, the postprocessor 134 ingests the generated image 139 and performs processing to prepare the output image 150. In some aspects, the projection subsystem 110 projects a portion of the input image 106 (e.g. a cropped region such as a face or a flower from within a larger image). In such cases, the generated image 139 is a subset of the input image 106, and the postprocessor 134 integrates the generated image 139 into the remaining portion of the input image 106 to generate the output image 150. Other postprocessing performed by postprocessor 134 may include smoothing portions of the generated image 139, increasing or decreasing the pixel size of the generated image 139, and/or combining multiple generated images 119.

The training subsystem 140 includes hardware and/or software configured to train one or more machine learning models as used by the image editing system 102. The training subsystem 140 includes a discriminator 136. The discriminator 136 is part of the GAN 138 including the generator 132, and evaluates the output of the generator 132 to train the generator 132. The discriminator 136 compares images produced by the generator 132 to target images (e.g., digital photographs, drawings, or the like). The discriminator 136 generates a score based on the comparison. For example, if the GAN 138 is trained on digital photographs, the score generated by the discriminator 136 indicates whether the discriminator has determined that an image generated by the generator is likely to be a real photograph or a computer-generated copy. The generator 132 works to "trick" the discriminator into determining that a generated image is actually a target image such as a real photograph. Such a competition between the discriminator 136 and the generator 132 can be used to teach the generator to produce extremely realistic images.

The training subsystem 140 further includes functionality to train the encoder 112, including one or more loss functions 144 that are minimized to train the encoder 112 to generate latent space representation that accurately represents the input image 106 and can be processed efficiently by the other elements of the projection subsystem 110. In some aspects, the training subsystem further includes functionality to train the edit configurer 122 and/or postprocessor 134. In some implementations, the training subsystem 140 is further configured to train the latent code transformer 114 to edit images.

The data storage unit 141 can be implemented as one or more databases or one or more data servers. The data storage unit 141 includes training data 142 that is used by the training subsystem 140 to train the engines of the image editing system 102. The training data 142 may include real images, synthetic images (e.g., as generated by the GAN), and/or latent space representations of the real and synthetic images.

Example Projection Pipeline

Figure 2:
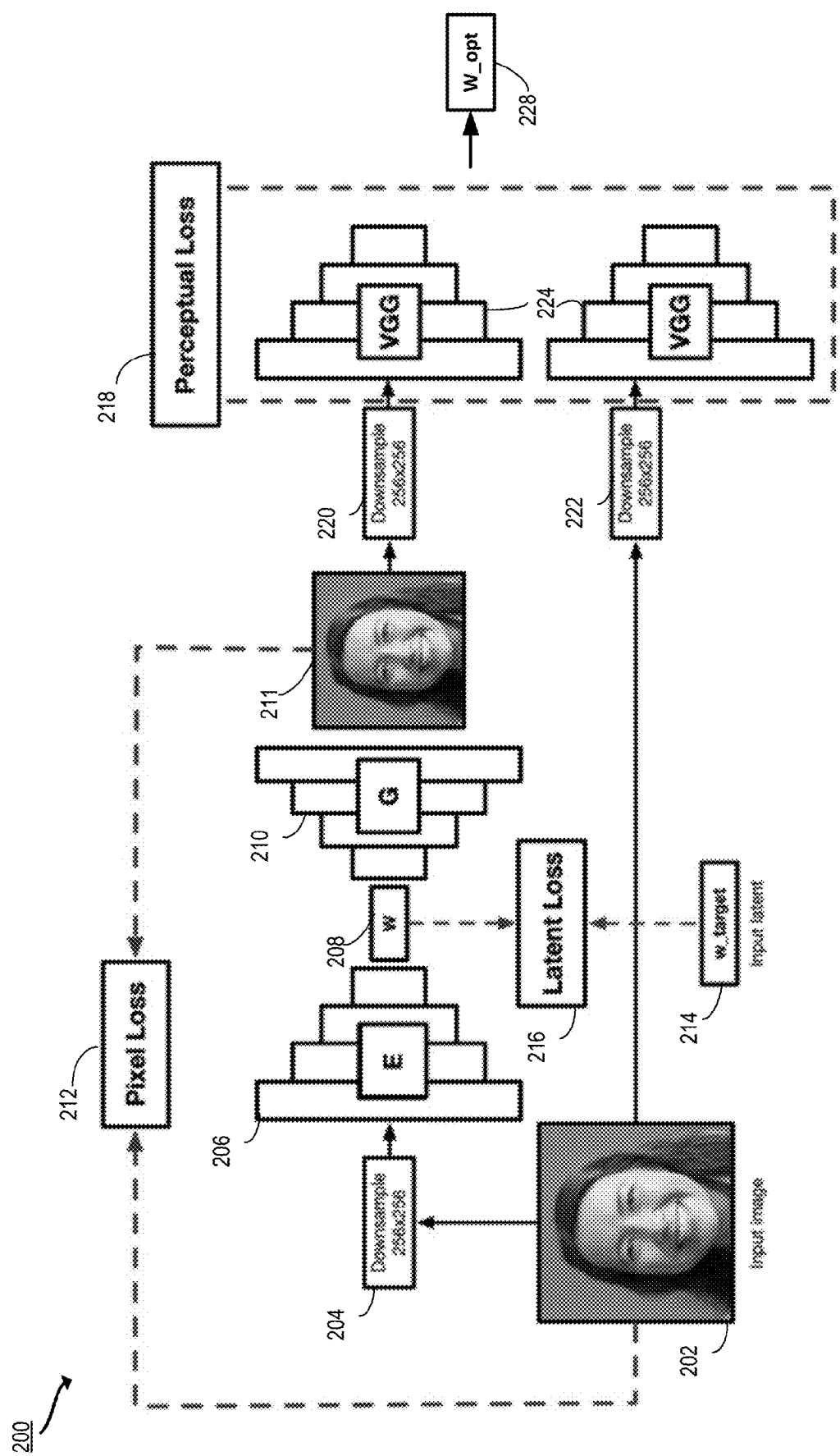
FIG. 2 depicts an example of a projection pipeline according to certain embodiments of the present disclosure.

FIG. 2 depicts an example of a projection pipeline 200 according to certain embodiments of the present disclosure. The projection pipeline 200 includes an encoder 206 and a generator 210. In the projection pipeline 200, an input image 202 is encoded using the encoder 206 to produce a latent space representation w 208, which is then optimized using a combination of pixel loss 212, latent loss 216, and perceptual loss 218, resulting in an optimized latent space representation w_opt 228. In some implementations, some or all of the processing of FIG. 2 may be performed by an image editing system (e.g., the projection subsystem 110 in cooperation with other components of the image editing system 102 of FIG. 1).

In some implementations, the projection process includes:
1. Use an encoder 206 to predict an initial latent code $w_0$
2. Initialize a variable w with the latent code $w_0$
3. For each iteration of the optimization, compute a loss between the target image 202 and the initial output image 211.

In some embodiments, the projection subsystem starts with an input image 202. This may be an image that a user seeks to edit, e.g., via an editor interface as shown in FIG. 1. The projection subsystem downsamples the input image 202 at 204. For example, the input image may be a relatively large image file such as a 1024×1024 pixel image. The projection subsystem may, for example, apply an algorithm such as bicubic interpolation to downsample the image. In the example depicted in FIG. 2, the projection subsystem downsamples the image to 256×256 pixels. In other examples, the projection subsystem may downsample the image to other resolutions (e.g., 128×128 pixels or 512×512 pixels).

In some embodiments, the projection subsystem feeds the downsampled image to the encoder 206. Using the encoder 206 (and potentially with additional mappings and transformations, as described above with respect to FIG. 1), the projection subsystem produces w 208, a latent space representation of the downsampled input image. The initial encoder output w 208 may diverge from the input image in certain respects. For example, without optimization, the image may not even look like the same person. The projection subsystem optimizes the latent space representation w using pixel loss 212, latent loss 216, and perceptual loss 218 to increase the similarity between the input image 202 and the ultimate output image. These losses may be minimized individually, or as part of a loss function with various terms as described below with respect to block 310 of FIG. 3.

In some embodiments, the projection subsystem minimizes a pixel loss 212. First, an initial output image 211 is generated by passing the latent space representation w 208 as input to the generator 210. The projection subsystem computes the pixel loss 212 as a function of the initial output image 211 and the input image 202. The projection subsystem minimizes the pixel loss 212, and the latent space representation w 208 is adjusted accordingly.

In some embodiments, the projection subsystem minimizes a perceptual loss 218. First, an initial output image 211 is generated by passing the latent space representation w 208 as input to the generator 210. The projection subsystem downsamples the initial output image 211 at 220 and passes the downsampled image as input to selected layers of a convolutional neural network (e.g., the Visual Geometry Group (VGG) network 224) to extract perceptual features. Similarly, the input image 202 is downsampled at 222 and passed as input to the selected layers of the VGG network 224 to extract perceptual features. Layers near the input layer of the VGG network tend to pick up pixel-level features, and deeper layers in the network pickup edges and blobs, and at layers closer to the output layer pick up object-level features. Accordingly, layers closer to the input layer or output layer can be selected to extract different levels of perceptual features. The projection subsystem computes the perceptual loss 218 as a function of the features extracted from the input image 202 and the initial output image 211. The projection subsystem minimizes the perceptual loss 218, and the latent space representation w 208 is adjusted accordingly.

In some embodiments, the projection subsystem minimizes a latent loss 216. A target latent space representation w_target 214 is identified. The latent loss 216 is computed as a function of the latent space representation w 208 and the target latent space representation w_target 214. The projection subsystem minimizes the latent loss 216, and the latent space representation w 208 is adjusted accordingly. After adjusting the latent space representation w using the perceptual loss 218, the pixel loss 212, and/or the latent loss 216, an optimized latent space representation w_opt 228 is produced.

Accordingly, in some embodiments, the projection subsystem minimizes loss functions or components including pixel loss 212, perceptual loss 218, and latent loss 216 to increase accuracy of projection onto the GAN latent space. These projection techniques and their advantages are described in further detail below with respect to FIGS. 3A-3B.

Example Techniques for Identity Preserving Latent Space Projection

Figure 3A:
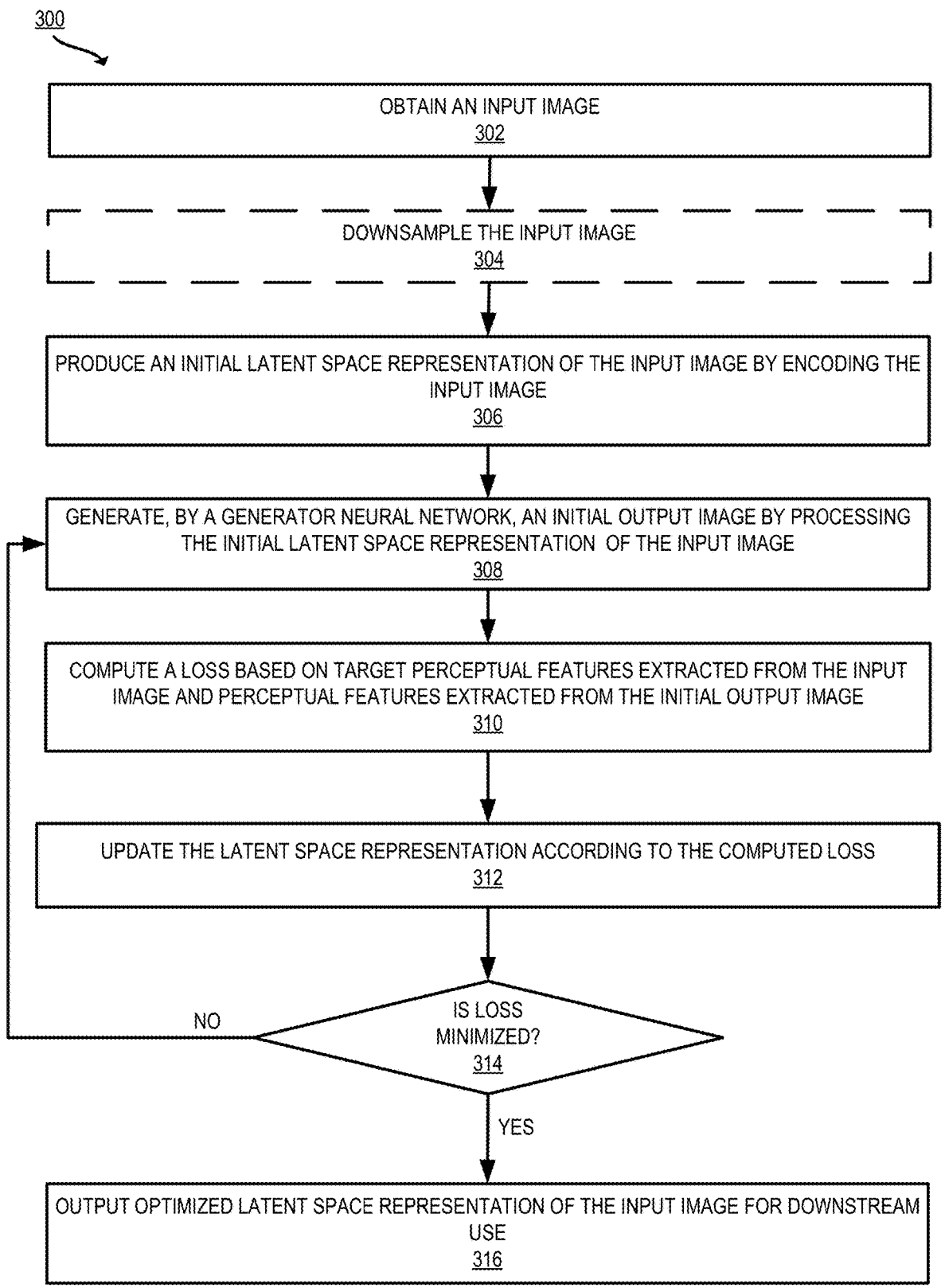
FIG. 3A depicts an example of a process for projecting an image into the latent space of a GAN with improved efficiency and identity preservation according to certain embodiments of the present disclosure.

FIG. 3A is a flowchart of an example process 300 for projecting an image into the latent space of a GAN with improved efficiency and identity preservation according to certain embodiments of the present disclosure. The processing depicted in FIG. 3A may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3A and described below is intended to be illustrative and non-limiting. Although FIG. 3A depicts the various processing steps occurring in a particular sequence or order, this is not intended to be limiting. In certain alternative embodiments, the processing may be performed in some different order or some steps may also be performed in parallel. In some implementations, one or more process blocks of FIG. 3A may be performed by an image editing system (e.g., the projection subsystem 110 in cooperation with other components of the image editing system 102 of FIG. 1). In some implementations, one or more process blocks of FIG. 3A may be performed by another device or a group of devices separate from or including the image editing system 102 (e.g., the editor interface 104 executing on a user device).

Figure 4:
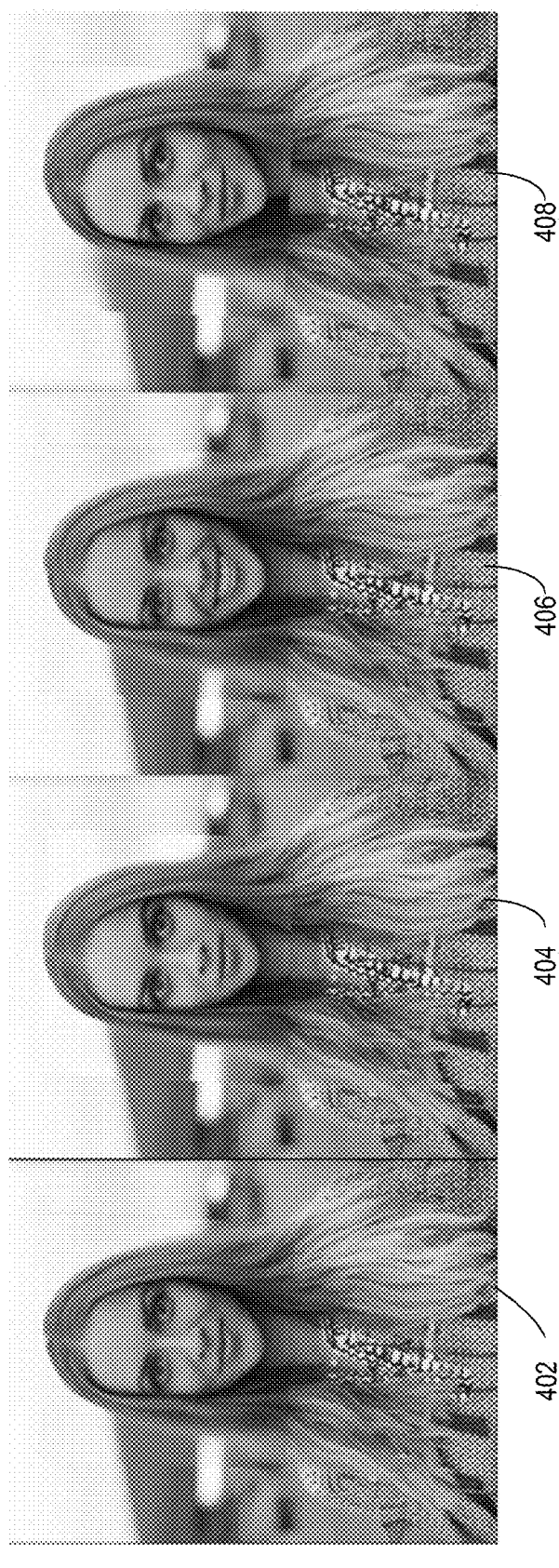
FIG. 4 depicts examples of images generated with edits using the techniques of FIGS. 3A-3B according to certain embodiments of the present disclosure.
Figure 5:
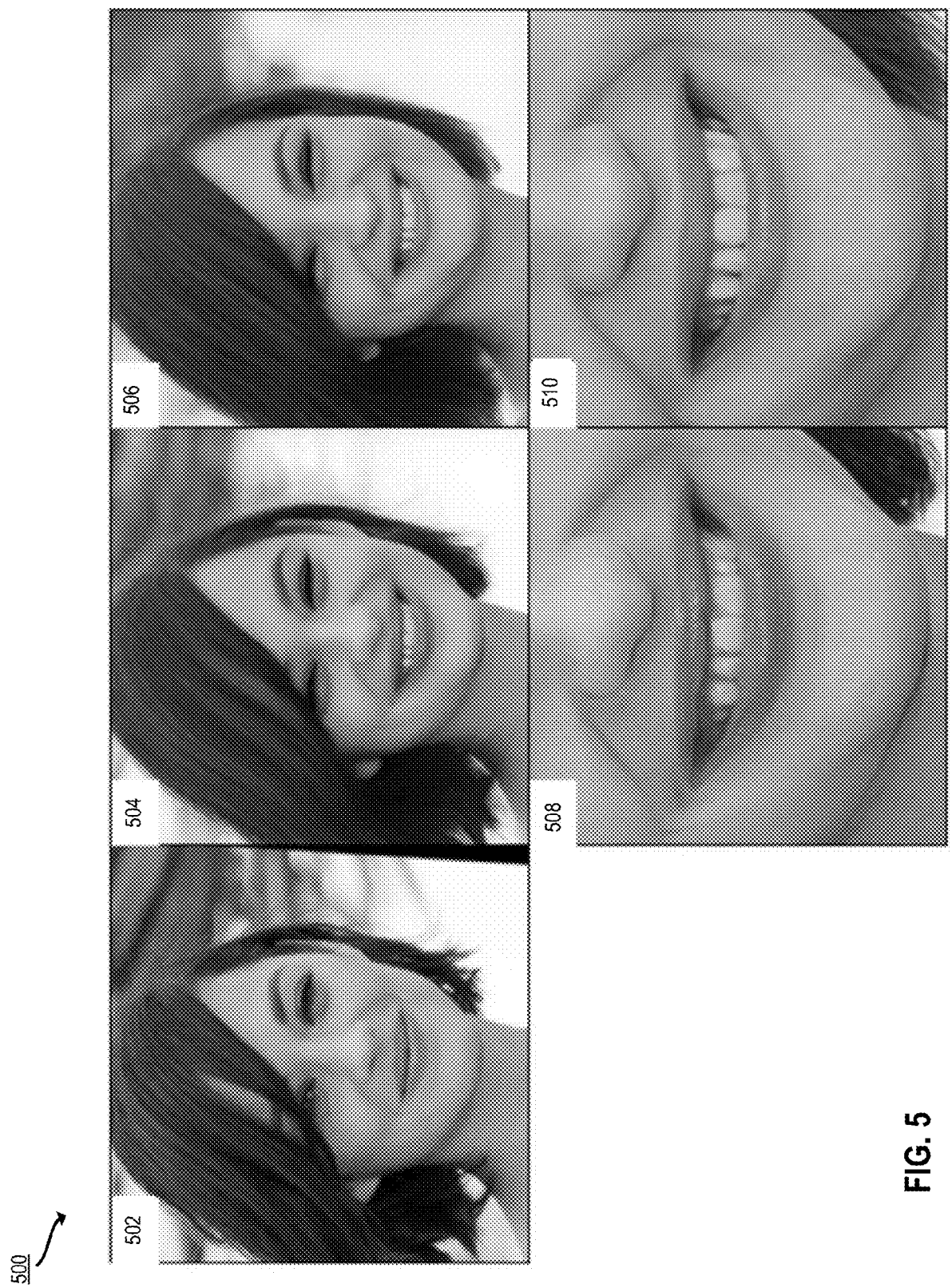
FIG. 5 depicts additional examples of images generated with edits using the techniques of FIGS. 3A-3B according to certain embodiments of the present disclosure.

In some embodiments, at 302, the projection subsystem obtains an input image. For example, the projection subsystem receives an input image that is uploaded via the editor interface 104. The input image may be an image file that is to be edited (e.g., to change facial expression or age, as shown in FIGS. 4 and 5). Alternatively, or additionally, the projection subsystem may obtain the input image by retrieving the image from a local or remote database.

In some embodiments, at 304, the projection subsystem downsamples the input image. For example, the projection subsystem can apply an interpolation algorithm such as area interpolation or bicubic interpolation, (see, e.g., Rajarapollu et al., *Bicubic Interpolation Algorithm Implementation for Image Appearance Enhancement*, IJCST Vol. 8, Issue 2 (2017)), to the input image obtained at 302 to generate a downsampled input image. In some implementations, the projection subsystem downsamples the input image to 256× 256 pixel resolution. Use of a downsampled input image can significantly increase the speed of the optimization process. The benefits of downsampling the input image include significant increases in projection speed, as the following steps are processed using a smaller input file size. As can be seen in the example outputs of FIGS. 4-5, an accurate and high resolution output can still be achieved. Alternatively, in some implementations, step 304 is omitted and the input image is provided as input to the encoder at 306 without downsampling.

In some embodiments, at 306, the projection subsystem produces an initial latent space representation of the input image by encoding the downsampled input image. For example, the projection subsystem produces the initial latent space representation by providing the downsampled input image as input to an encoder (e.g., to generate a Z space representation of the input image). This results in a latent space representation z of the input image. In some implementations, the latent space representation is further modified to map to W space and/or augmented to $W_p$ space, as described above with respect to FIG. 1. Alternatively, a $W_p$ space representation can be generated directly using the techniques described in "Direct Regression Encoder Architecture and Training," filed concurrently herewith. By encoding the image before optimization, the projection subsystem initializes the optimization using an encoded image that is similar to the input image. Encoding the image before optimization further speeds up the optimization process, as the time to converge is faster when starting with a similar image rather than starting with a random image (e.g., as drawn from a Gaussian distribution).

In some embodiments, at 308, the image editing system generates, by a generator neural network, an initial output image by processing the latent space representation of the input image. For example, the projection subsystem transmits the latent space representation of the input image to the image generation subsystem 130. The image generation subsystem passes the filtered latent space representation as input to a generator neural network to generate the initial output image. Techniques for image generation with a generative model are described in detail in, e.g., Goodfellow et al., *Generative Adversarial Nets*, NIPS 2014, arXiv: 1406.2661v1 (2014) and Karras et al. (2019) (StyleGAN, supra).

The image editing system may initially generate a first initial output image by processing the initial latent space representation generated at 306. Subsequently, after updating the latent space representation at 312, the image editing system may generate one or more updated initial output images by processing the updated latent space representation(s) in the course of one or more subsequent iterations of the optimization process (e.g., a second initial output image, a third initial output image, etc.).

At 310, the projection subsystem computes a loss based on target perceptual features extracted from the input image and perceptual features extracted from the initial output image. Perceptual features are visually representable properties of objects, such as size, shape, color, position, facial expression, etc. These perceptual features are compared, for the input image and the initial output image (e.g., a first initial output image and/or updated initial output images generated at 308), to compute the loss. Techniques for extracting the perceptual features and computing a suitable loss function are described in further detail below with respect to FIG. 3B.

At 312, the projection subsystem updates the latent space representation according to the computed loss. The projection subsystem may use a suitable optimizer to compute an updated value of w.

In some implementations, the latent space representation is updated by computing $$\text{argmin } w = \text{Loss}(w,x)$$

by applying an optimization algorithm (as further described below with respect to block 314) to the latent space representation w using the loss computed as described with respect to block 310 and FIG. 3B.

At 314, the projection subsystem determines whether the loss is minimized. In some implementations, the projection subsystem applies the Limited-memory Broyden-Fletcher-Goldfarb-Shanno algorithm (L-BFGS) to minimize the loss function. L-BFGS uses a limited amount of computer memory. Use of L-BFGS for the optimization can speed up the optimization process and limit the amount of computational resources required. Compared to other optimizers tested, it has been found that the SciPy L-BFGS optimizer generates the best results in the least amount of time. Alternatively, or additionally, other optimizers may be implemented, such as traditional BFGS, Quasi-Newton Method, or the Davidson-Fletcher-Powell (DFP) formula.

If the loss is not minimized at 314, then the flow returns to 308. The updated initial latent space representation is used to generate an updated initial output image at 308. Thus, the projection subsystem updates the latent space representation iteratively based on the minimized loss (e.g., to generate a first updated latent space representation, a second updated latent space representation, and so forth).

This can be repeated until eventually the latent space representation is sufficiently optimized (e.g., optimization has converged), at which point the loss is minimized at 314. If the loss is minimized at 414, then the process 300 proceeds to 316. When the loss is minimized, the updated latent space representation is considered optimized. Thus, one or more operations in blocks 308-314 generate an optimized latent space representation of the input image using a loss minimization technique that minimizes a loss between the input image and the initial output image, wherein the loss is based on target perceptual features extracted from the input image and initial perceptual features extracted from the initial output image.

The optimized latent space representation is one that will produce an output image that looks very similar to the input image (e.g., indistinguishable or almost indistinguishable to the human eye). Without optimization, the generator can produce a high resolution and photorealistic image, but the image will not look perceptually similar to the input image. For example, for images including a human face, without optimization, the output image will generally not look like the same person as that depicted in the input image. Once the latent space image is optimized, the ultimate output image will be perceptually similar to the input image. Perceptually similar images have similar perceptual features. For example, for images including human faces, perceptual features include hair color, nose shape, and facial expression. Images that are perceptually similar will generally look like the same person.

One or more operations in blocks 308-314 implement a step for optimizing the initial latent space representation based on target perceptual features extracted from the input image and initial target features extracted from the initial output image. For instance, at 308, the projection subsystem processes the initial latent space representation with a generator neural network to generate an initial output image, and at 310, the projection subsystem minimizes a loss between the input image and the initial output image to generate the optimized latent space representation, as described above and with respect to FIG. 3B.

In some embodiments, at 316, the projection subsystem outputs the optimized latent space representation of the input image for downstream use. The downstream use may include applying user-configured edits to the latent space representation. For example, the latent space representation may be modified in a way that corresponds to changes such as making a face in an image appear to smile or look older, add high heels to a shoe in an image, and so forth. Alternatively, or additionally, the downstream use may include processing the optimized latent space representation with the generator neural network to generate an output image that is perceptually similar to the input image. This may be performed in a similar fashion as described above with respect to block 308, but using the optimized latent space representation as the input to the generator. The optimized latent space representation provided to the generator as input may be edited or unedited.

In some implementations, the generating the initial latent space representation, optimizing the initial latent space representation, and generating the output image that is perceptually similar to the input image is performed in less than about 10 seconds, in less than about 9 seconds, and/or in less than about 8 seconds. The techniques of FIG. 3A efficiently produce a projection without identity loss at high-resolution (e.g., 1024×1024 pixels) in about 8 seconds on a Nvidia Tesla V100 GPU. Accordingly, the techniques described above with respect to FIG. 3 significantly reduce the speed of generating a high-resolution and accurate image, which takes several minutes in many prior systems.

In some embodiments, the process 300 further includes outputting the output image to a computing device for display. The computing device may correspond to the editor interface 104 depicted in FIG. 1 (e.g., executing on a user device or the image editing system itself). For example, the image editing system outputs the output image to a user device, thereby causing the user device to display the output image via the editor interface displayed on the user device. Alternatively, or additionally, the image editing system transmits instructions for rendering the output image to an external computing device. Alternatively, or additionally, the image editing system renders the output image on a display component of the image editing system itself.

In some embodiments, prior to the processing of FIG. 3, the encoder is trained on synthetic images. For example, the encoder is trained on images generated by a generator such a StyleGAN generator (as described in Karras et al. (2019), supra). In some implementations, the generator-created images are generated from a Gaussian distribution. In some implementations, the Gaussian distribution is truncated (e.g., using a truncation value of 0.7). Training with synthetic images has been found to provide regularization, leading the encoder to predict latent codes corresponding to images that the generator implemented (e.g., StyleGAN) can generate accurately.

Figure 3B:
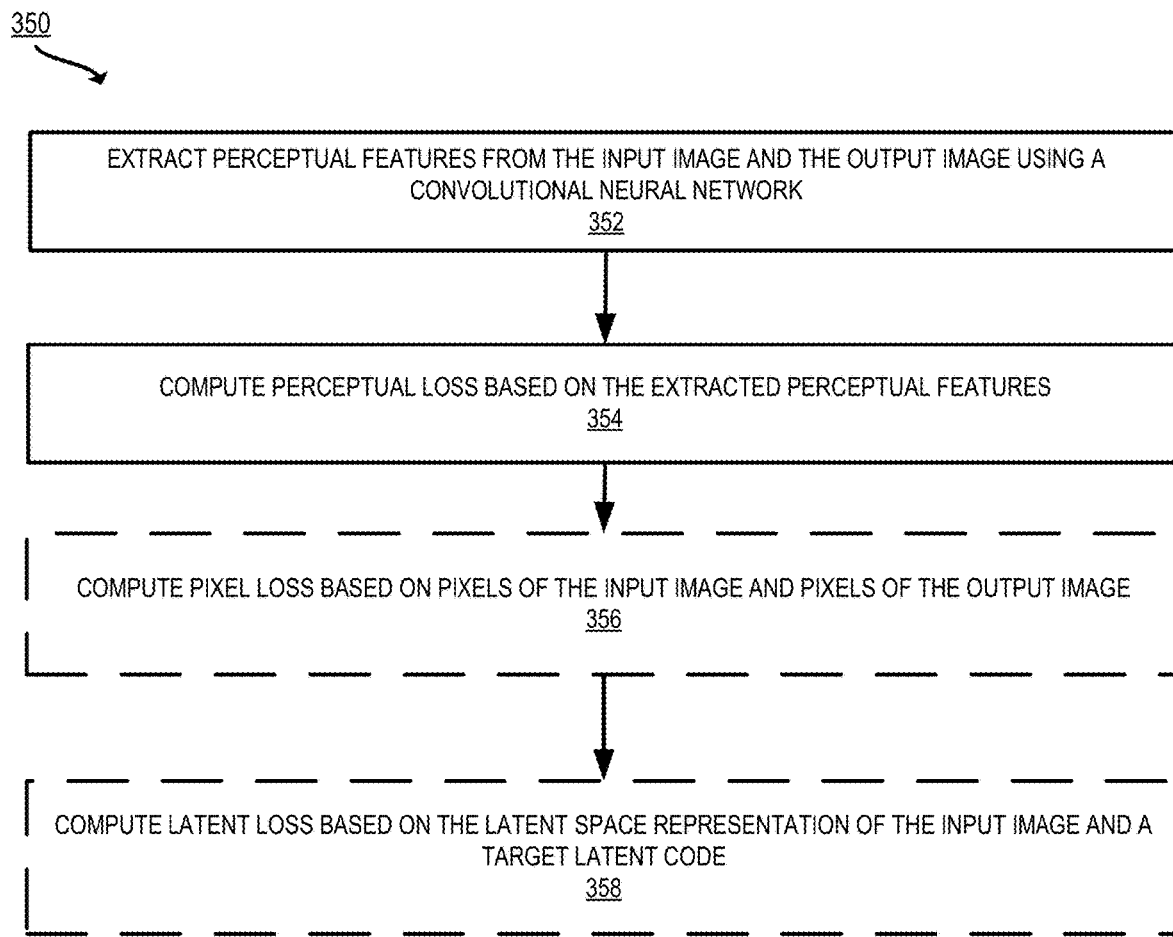
FIG. 3B depicts an example of a process for computing a loss as used in the process of FIG. 3A according to certain embodiments of the present disclosure.

FIG. 3B is a flowchart of an example process 350 for computing a loss (e.g., at block 310 of FIG. 3A) according to certain embodiments of the present disclosure. The processing depicted in FIG. 3B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3B and described below is intended to be illustrative and non-limiting. Although FIG. 3B depicts the various processing steps occurring in a particular sequence or order, this is not intended to be limiting. In certain alternative embodiments, the processing may be performed in some different order or some steps may also be performed in parallel. In some implementations, one or more process blocks of FIG. 3B may be performed by an image editing system (e.g., the projection subsystem 110 in cooperation with other components of the image editing system 102 of FIG. 1). In some implementations, one or more process blocks of FIG. 3B may be performed by another device or a group of devices separate from or including the image editing system 102 (e.g., the editor interface 104 executing on a user device).

At 352, the projection subsystem extracts perceptual features from the input image and the initial output image using a convolutional neural network. As described above with respect to FIG. 3A, perceptual features such as size, shape, color, and the like can be extracted from an image.

In some embodiments, to extract perceptual features, the image editing system extracts the perceptual features using a convolutional neural network trained to classify images. The output of different layers of such a classifier network can be correlated to different perceptual features in an image. Both the initial output image(s) generated at block 308 of FIG. 3B and the original input image (e.g., the target image which the optimization process aims to replicate) are passed as input to the convolutional neural network (e.g., at an input layer) and the perceptual features are extracted from selected layers of the convolutional neural network.

In some implementations, the convolutional neural network is a Visual Geometry Group (VGG) network, e.g., as described in Simonyan et al., *Very Deep Convolutional Networks for Large-Scale Image Recognition*, ICLR 2015, arXiv:1409.1556v6 (2015). The VGG network architecture includes a stack of convolutional (conv.) layers, three fully-connected layers, and a softmax layer. In some aspects, the projection subsystem selects the layers so that high-level and low-level features are extracted. Minimizing loss between features of different levels has been found to steer the latent space representation to preserve identity. Suitable layers from which to extract the features as output include the conv1_1 layer, the conv1_2 layer, the conv3_1 layer, and the conv4_1 layer of the Visual Geometry Group Very Deep 16 (VGG-VD-16) network.

In some, embodiments, the projection subsystem converts weights from the TensorFlow VGG format to PyTorch format before executing a PyTorch based convolutional neural network (e.g., PyTorch VGG). This has been found to produce improved projections over use of TensorFlow or PyTorch weights alone. The input of PyTorch is between zero and one, and the input to TensorFlow is negative one to one. This widened range helps the optimization to converge. Accordingly, in some implementations, weights are computed in a first format with a first range and converted to a first format with a second range. The first range is larger than the second range.

The perceptual features extracted from the initial output image represent initial perceptual features. These perceptual features may differ from the actual perceptual features in the input image that the projection subsystem aims to replicate (e.g., the target perceptual features). By minimizing a loss between the initial perceptual features and the target perceptual features, the projection subsystem increases the perceptual similarity between the input image and the final output image that can ultimately be generated using the latent code.

In some implementations, the projection subsystem further downsamples the images before extracting the perceptual features. For example, the projection subsystem computes the perceptual loss component by downsampling the initial output image and passing the downsampled initial output image as input to the convolutional neural network. The projection subsystem extracts the initial perceptual features as output from a subset of layers of the convolutional neural network. The projection subsystem also passes the downsampled input image (e.g., as computed at 304) as input to the convolutional neural network to extract target perceptual features from the subset of the layers of the convolutional neural network. The projection subsystem computes the perceptual loss as a function of the target perceptual features and the initial perceptual features.

At 354, the projection subsystem computes a perceptual loss based on the perceptual features extracted at 352. For example, the perceptual loss is the normalized difference between the perceptual features extracted from the input image and the perceptual features extracted from the initial output image generated by processing the latent space representation with the generator:

$$\text{PerceptualLoss}(G(w),x) = \|P(G(w)) - P(x)\|,$$

where $P(G(w))$ is the perceptual features extracted from the output image generated by processing the latent space representation of the generator and $P(x)$ is the perceptual features extracted from the input image. As illustrated in FIG. 3A, computing the loss and generating the output image may be performed iteratively until convergence. Accordingly, as the latent space representation is updated in the optimization process, the output image may be regenerated and the perceptual loss may be recomputed.

In some implementations, the loss may further include a pixel loss component and/or a latent loss component. Steps 356 and 358 may optionally be performed to compute the pixel loss and latent loss components.

At 356, the projection subsystem computes a pixel loss component $$\text{PixelLoss}(G(w),x)$$

based on pixels of the input image x and pixels of the initial output image G(w). For example, the pixel loss may be a sum of differences of pixel values between some or all pixels in the input image and corresponding pixels in the initial output image. An example of a suitable pixel loss function is:

$$\frac{1}{n}\sum_{i=1}^{n}|G(w)_i - x_i|^2$$

where the pixels of the initial output image G(w) are given by G(w)$_i$ and the pixels of the input image x are given by x$_i$, and the square of the absolute value of the difference of each respective pixel is summed over the number of pixels of interest n (e.g., n total pixels in the images). In some implementations, the downsampled input image generated at 304 is used for x for consistency in image size and resolution for comparison.

At 358, the projection subsystem computes a latent loss component based on the initial latent space representation and a target latent code. For example, the latent loss is given by the absolute value of the difference between the initial latent space representation and a target latent code, $$\|w - w\_target\|,$$

where w is the latent space representation encoded at 306. The target latent code w_target can be a selected latent code such as the mean latent code from the training of the generator neural network. In some implementations, a user can provide a user-specified guiding latent code w_target, which allows for increased control in steering the projection.

The loss function used at 310 may include one or more of the perceptual loss computed at 354, the pixel loss computed at 356, and/or the latent loss computed at 358. For example, the loss function is equal to:

$$\text{Loss}(w,x,w\_target) = \text{PixelLoss}(G(w),x) + \text{PerceptualLoss}(G(w),x) + \|w - w\_target\|$$

This loss function, including a pixel loss component, a perceptual loss component, and a latent loss component, has been found to converge in a relatively fast timeframe (<10 s) while preserving identity and resolution.

The projection techniques of FIGS. 2 and 3A-3B provide many advantages over prior systems. These techniques offer a reasonable compromise between efficiency and accuracy. Projection time using the techniques disclosed herein is less than about 10 seconds (e.g., 8 seconds), compared to prior systems that take several minutes. Further, the techniques of FIGS. 2 and 3 are identity preserving, high resolution (e.g., 1024×1024 pixels), and editable. In some aspects, the techniques of FIGS. 2 and 3 can be applied without the need to modify the architecture of the GAN. The techniques of FIGS. 2 and 3A-3B described above provide identity preserving projection. The output images generated using the projection techniques described above are able to maintain identity with (e.g., for face images, the identity of the person is maintained), and perceptual similarity to, the input image. This is in contrast to some prior systems which fail to maintain identity, so that the generated face images look noticeably like a different person than depicted in the input image.

Example Results—Identity Preserving Latent Space Projection

FIG. 4 shows a series of images 400 illustrating edited images generated using the projection techniques of FIGS. 3A and 3B, according to some embodiments. The process starts with an input image 402. The projection techniques of FIGS. 3A and 3B are used to discover an optimized latent space representation w which can be edited to make global changes to the image.

Images 404, 406, and 408 have been edited using an optimized latent space representation as generated using the techniques of FIGS. 3A and 3B. In image 404, the optimized latent space representation has been edited so that the face in the output image appears younger. In image 406, the optimized latent space representation has been edited so that the face in the output image is smiling. In image 408, the optimized latent space representation has been edited so that the face in the output image is rotated.

Using the projection technique described above with respect to FIGS. 3A-3B, the images 404, 406, and 408 remain consistent with the input image 402—the edited images 404, 406, and 408 still look like the same person as that in the input image 402.

FIG. 5 depicts a set of images 500 illustrating the use of latent loss to improve details in an output image. In these examples, the loss minimized in the process of FIG. 3A includes the latent loss component computed at block 358 of FIG. 3B. The latent loss component can be particularly useful in creating realistic features. In particular, teeth and eyes often become unrealistic in GAN generated images after editing. Using the techniques of FIGS. 3A-3B, these issues can be resolved.

Image 502 shows an input image which includes a picture of a human face. Images 504-510 show images generated based on the input image 502. The images 504-510 have been generated using the techniques described above with respect to FIGS. 3A-3B and the latent space representation of the input image has been edited so that the face depicted in the output image has a smiling expression.

The process for generating images 504 and 508 includes optimizing a latent space representation of the input image 502 (starting either with randomly sampled latent code or an initial latent space representation generated with an encoder) using a computed loss to generate an optimized latent space representation of the input image. The computed loss, however, does not include a latent loss component. The optimized latent space representation is edited so that the person depicted in the image appears to smile. This edited latent space representation is processed using a generator to generate output image 504 (shown zoomed in as image 508 to highlight the teeth). In images 504 and 508, the teeth appear stained and brown. This is a common issue in generated images using prior techniques.

On the other hand, the process for generating images 506 and 520 includes optimizing a latent space representation of the input image 502 using a computed loss to generate an optimized latent space representation of the input image, as described above with respect to FIGS. 3A-3B. The computed loss used to generate image 506 includes a latent loss component, as described above with respect to FIG. 3B. The optimized latent space representation is edited so that the person depicted in the image appears to smile. This edited latent space representation is processed using a generator to generate output image 506 (shown zoomed in as image 510 to highlight the teeth). Using these techniques, as shown in images 506 and 520, the appearance of the teeth is significantly improved while reasonably maintaining identity with the input image 502.

Example Techniques for Multi Resolution Output

Figure 6:
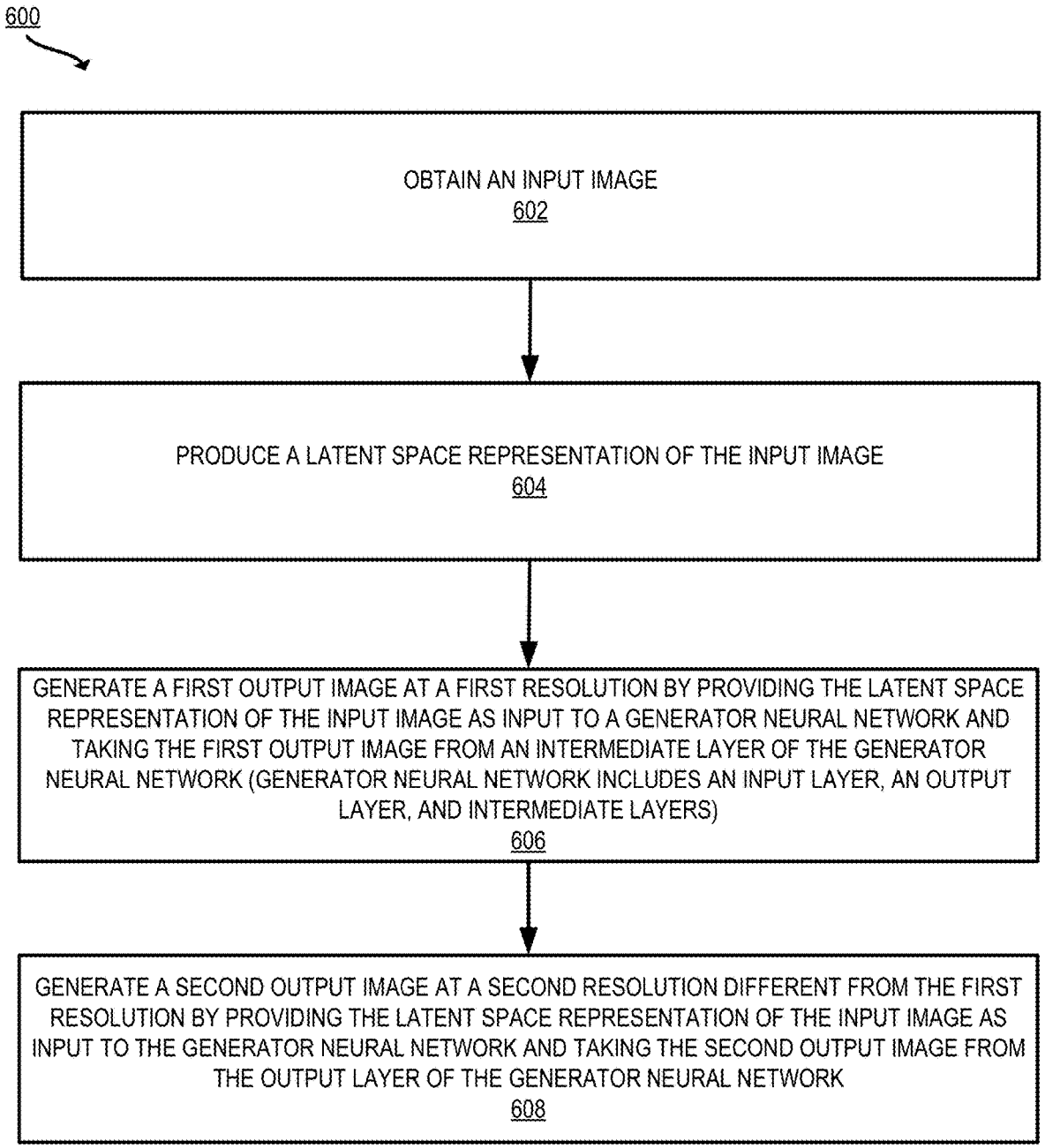
FIG. 6 depicts an example of a process for generating multi-resolution outputs from a GAN according to certain embodiments of the present disclosure.

FIG. 6 is a flowchart of an example process 600 for generating multi-resolution outputs from a GAN according to certain embodiments of the present disclosure. The processing depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the processing may be performed in some different order or some steps may also be performed in parallel. In some implementations, one or more process blocks of FIG. 6 may be performed by an image editing system (e.g., the projection subsystem 110 in cooperation with other components of the image editing system 102 of FIG. 1). In some implementations, one or more process blocks of FIG. 6 may be performed by another device or a group of devices separate from or including the image editing system 102 (e.g., the editor interface 104 executing on a user device).

In some embodiments, at 602, the projection subsystem obtains an input image. For example, the projection subsystem receives an input image that is uploaded via the editor interface, as described above with respect to block 302 of FIG. 3A.

In some embodiments, at 604, the projection subsystem produces a latent space representation of the input image. For example, the projection subsystem produces the latent space representation of the input image by providing the input image as input to an encoder, in a similar fashion as described above with respect to block 306 of FIG. 3A. This may be an initial latent space representation before optimization, or an updated latent space representation during or after optimization.

In some embodiments, at 606, the image editing system generates a first output image at a first resolution by providing the latent space the latent space representation of the input image as input to a generator neural network. The generator neural network is configured to take a latent space representation as input and generate an image as output (e.g., as described above with respect to block 308 of FIG. 3A). The generator neural network includes an input layer, multiple intermediate layers, and an output layer. An intermediate layer is a layer other than the input or output layers of the neural network (e.g., a hidden layer). The input image is provided as input to the input layer. This input image is taken from one of the intermediate layers as output (e.g., from a first intermediate layer of the generator neural network).

Figure 7:
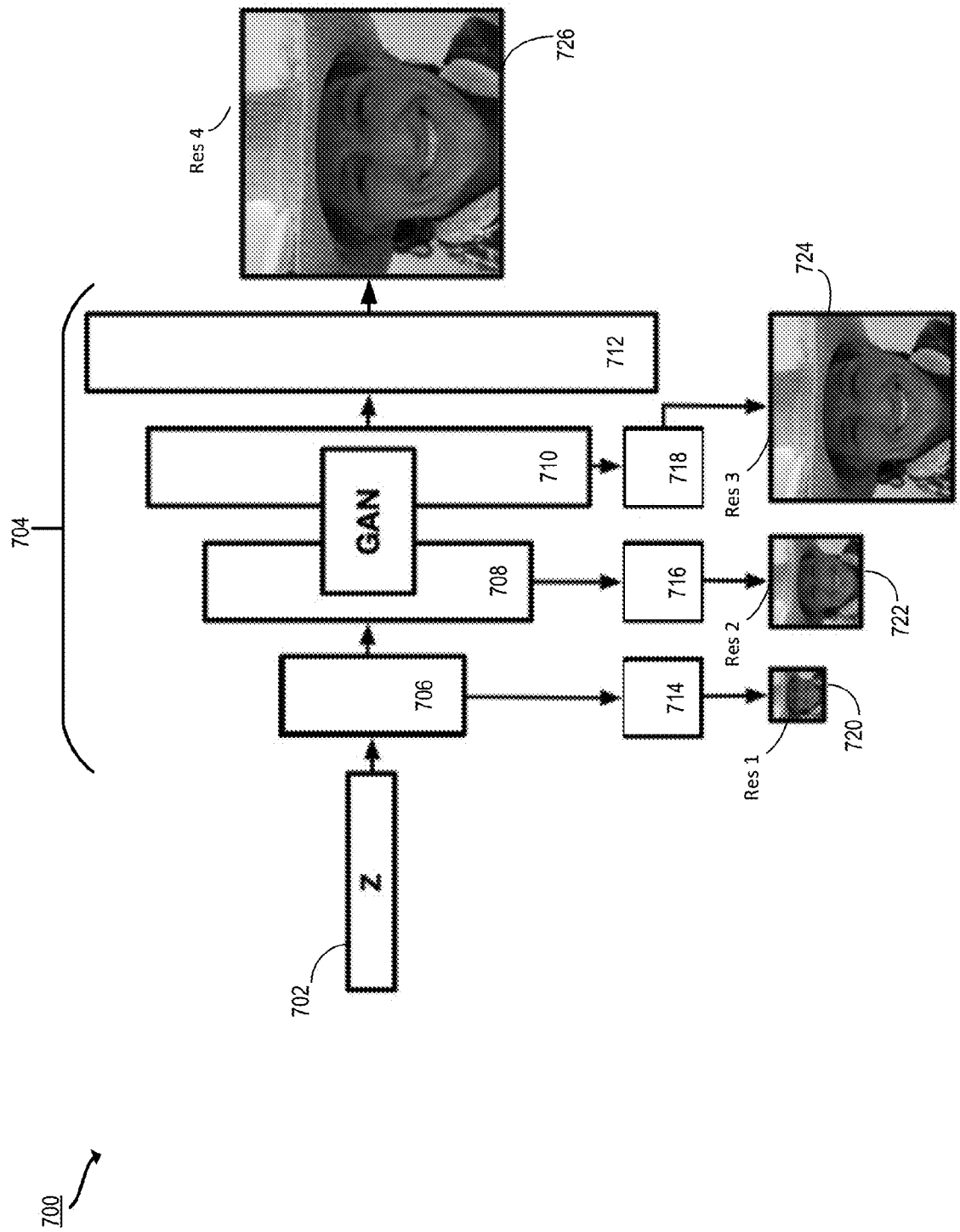
FIG. 7 depicts a schematic diagram illustrating the multi-resolution output process of FIG. 6 according to certain embodiments of the present disclosure.
Figure 8:
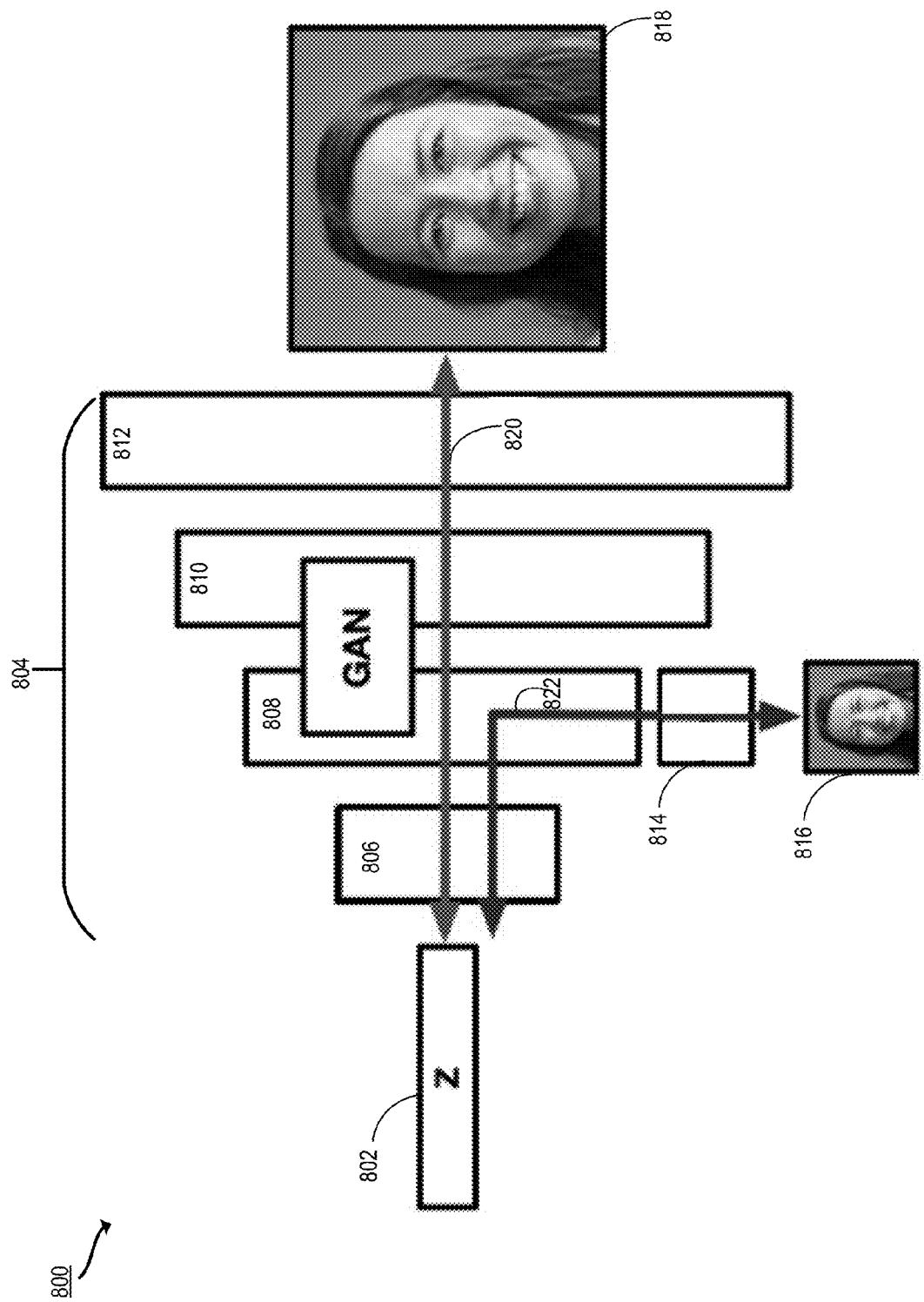
FIG. 8 depicts another schematic diagram illustrating the multi-resolution output process of FIG. 6 according to certain embodiments of the present disclosure.

In some embodiments, the generator neural network is coupled to one or more auxiliary neural networks. The auxiliary neural network(s) are configured to output images from an intermediate layer of the generator neural network. For example, as illustrated in FIGS. 7 and 8, auxiliary neural networks are attached to intermediate layers of the generator neural network. The auxiliary neural network is a branch which maps the features from an arbitrary layer in a generator neural network to a low-resolution image resembling the high-resolution image output of the generator neural network. Alternatively, the auxiliary branch can be another type of machine learning model configured to output an image from the intermediate layer. The first output image is output via the auxiliary branch. These branches can be analogized to the levels of an image pyramid. These auxiliary neural networks, may, for example, function as an image-to-image network. In some aspects, the features from an intermediate layer of the generator neural network are input to the auxiliary neural network and processed using residual block layers to output a relatively low-resolution image.

As a specific example, the first output image is output via a second neural network, which is one of the one or more auxiliary neural networks. Features are extracted from the intermediate layer of the generator neural network and processed by the second neural network to generate the first output image. One or more operations in block 606 implement a step for generating a first output image at a first resolution using an intermediate layer of the generator neural network.

In some embodiments, the image editing system performs optimization operations, as described above with respect to FIGS. 3A-3B. The optimization process is performed using the output of the intermediate layer of the generator neural network, using the auxiliary neural network to extract images. The image editing system uses initial first output images output via the auxiliary neural network to minimize a loss function with respect to the input image until convergence. This provides relatively fast optimization since only a subset of layers of the generator neural network are used.

In some embodiments, at 608, the image editing system generates a second output image at a second resolution. The image editing system provides the latent space representation of the input image as input to the input layer of the generator neural network to generate the second output image. The second output image is output from the output layer of the generator neural network. The second resolution of the second input image is different from (e.g., higher than) the first resolution of the first output image. In some implementations, the second output image is a relatively high resolution or large size (e.g., about 1024×1024 pixels) final output image, and the first output image is a lower resolution version of the second output image. In some aspects, the lower resolution image generated at 606 roughly matches the high-resolution GAN output generated at 608 after down-sampling. One or more operations in block 608 implement a step for generating a second output image at a second resolution different from the first resolution using an output layer of the generator neural network.

In some embodiments, the projection subsystem performs optimization operations, as described above with respect to FIGS. 3A-3B. The projection subsystem may use an initial second output image to minimize a loss function with respect to the input image until convergence, using images generated as output of the output layer of the neural network, until arriving at an optimized second output image. Since the first output image has a shorter path through the generator (e.g., as illustrated in FIG. 8), optimization at 606 is significantly faster than optimization at 608 (e.g., at 606 the projection subsystem is performing forward and backward passes through a shorter path of the GAN, i.e., using layers closer to the input layer). These techniques can also be used in a coarse-to-fine regularization.

In some embodiments, additional output images are extracted from additional intermediate layers of the generator neural network. The projection subsystem may include multiple auxiliary neural networks for extracting preview images, as illustrated in FIG. 7. For example, the projection subsystem generates a third output image using another intermediate layer of the generator neural network. The image editing system provides the latent space representation of the input image as input to the generator neural network. The image editing system takes the third output image from a second intermediate layer of the generator neural network. The third output image is of a different resolution than the first input image and the second input image (e.g., a fifth resolution).

In some implementations, the generator neural network includes a first auxiliary neural network (e.g., a second neural network) configured to output images from the first intermediate layer of the generator neural network and a second auxiliary neural network (e.g., a third neural network) configured to output images from the second intermediate layer of the generator neural network. The first output image is output via the first auxiliary neural network, and the third output image is output via the second auxiliary neural network. For example, as shown in FIG. 7, the generator neural network can be augmented with multiple auxiliary neural networks 714, 716, and 718. Each of these can be used to generate output images (e.g., quick preview images). The generator neural network also generates a final output image 726 by processing the input latent space representation via the output layer.

In some embodiments, subsequent to generating the first output image and the second output image, the image editing system outputs the first output image and the second output image for display on a computing device (e.g., the editor interface 104 illustrated in FIG. 1). For example, the image editing system transmits instructions to a user device for rendering the editor interface to include the first output image and the second output image. The first and second output images may be displayed one after another. For example, the first output image is displayed during an optimization process of the second output image, and after optimization of the second output image is complete, the second output image is displayed. Alternatively, or additionally, the image editing system may display the first output image and the second output image simultaneously.

In some embodiments, the first output image is generated in less than about five seconds after obtaining the input image. Since first output image is processed using a subset of the generator neural network, the first output image (e.g., a preview image) can be generated more quickly than the second output image (e.g., a final output of the generator). With the projection enhancing techniques described above with respect to FIGS. 3A-3B, the complete projection and generation process can be accomplished in around 8 seconds. By generating the preview images using a subset of the neural network (e.g., at 606), the preview image(s) can be generated even faster, in about 4 seconds.

The lower resolution image(s) generated at 606 can be used, for example, to quickly obtain a preview image as a large image is being processed. In some applications, the image editing system provides output such that the user can watch the image develop over time. For example, a low resolution image is displayed, then a medium resolution image, then a higher resolution image, then a highest resolution image (e.g., the first output image, third output image, and second output image are displayed in turn).

The image editing system may train the auxiliary neural network(s) at some initial time. For example, the training subsystem trains an auxiliary neural network on an input training image. The input training image has some resolution (e.g., a third resolution). The training subsystem generates a training image with a resolution lower than that of the input training image (e.g., a fourth resolution less than the third resolution). For example, the lower resolution training image can be generated using downsampling techniques as described above with respect to block 304 of FIG. 3. The training subsystem extracts features from the first intermediate layer of the generator neural network. For example, the input image is sent as input to the input layer of the generator neural network and data is extracted from the layer of the generator at which the auxiliary neural network will be applied (e.g., the first intermediate layer, the second intermediate layer, etc.). This data may then be processed using the auxiliary neural network to generate a training output image. The training subsystem minimizes a loss between the reduced-resolution version of the input image and the extracted features from the intermediate layer. The auxiliary neural network is trained (e.g., using backpropagation) to output lower resolution images which match the high-resolution generator neural network output as closely as possible. In some aspects, once the auxiliary neural network is trained, the auxiliary neural network is attached to the generator neural network. This results in an auxiliary neural network configured to generate an image from an intermediate layer of the generator neural network relatively quickly.

The techniques of FIG. 6 can also be applied to other generative models other than GANs. While the example of FIG. 6 is described with respect to image data, these techniques can also be applied to generate previews using other types of data like audio or video data.

Example Results—Multi-Resolution Output

FIG. 7 depicts a schematic diagram 700 illustrating the multi-resolution output process of FIG. 6 according to certain embodiments of the present disclosure. The pipeline depicted in FIG. 7 includes a latent space representation of an input image z 702 (e.g., an initial input image before optimization; updated latent space representations may also be provided during or after optimization). The latent space representation of the input image z 702 is processed by a pretrained GAN 704 to generate an output image 726.

The GAN further includes auxiliary neural networks 714, 716, and 718. These auxiliary neural networks 714-718 are attached to intermediate layers of the GAN. These auxiliary neural networks 714-718 are trained to generate low-resolution preview images of the ultimate GAN output image 726.

The GAN 704 includes layers 706, 708, 710, and 712. Each layer is larger in size than the previous layer. Each respective layer is capable of generating images of increased resolution. For example, the GAN may start at layer 706 by generating an image at a first resolution Res1 (e.g., a 8×8 or 4×4 pixel image) and generate images increasing in resolution with successive layers (e.g., 64×64 pixels at layer 708, 1024×1024 pixels at layer 710, and 2400×2400 pixels at layer 712).

The first auxiliary neural network 714 generates a lowest resolution (Res1) preview image 720 from layer 706, closest to the input layer of the GAN 704. The second auxiliary neural network 716 generates a higher resolution (Res2) preview image 722 from layer 708, further from the input layer of the GAN 704. The third auxiliary neural network 718 generates a highest resolution (Res3) preview image 724 from layer 710, closer to the output layer of the GAN 704. In this fashion, intermediate images are output of different resolutions. The final output image 726 has a higher resolution than the preview images (Res4). Thus, Res1<Res2<Res3<Res4.

FIG. 8 depicts another schematic diagram 800 illustrating the multi-resolution output process of FIG. 6 according to certain embodiments of the present disclosure. Similarly to FIG. 7, the pipeline depicted in FIG. 8 includes a latent space representation of an input image z 802, which is processed by a pretrained GAN 804 to generate an output image 818. The GAN 804 includes layers 806-812 of increasing size and distance from the input layer of the GAN 804.

The GAN includes auxiliary neural network 814 attached to an intermediate layer 808 of the GAN 804. The auxiliary neural network 814 is trained to generate a relatively low-resolution preview image 816 of the ultimate GAN output image 818.

FIG. 8 shows the path 822 of the preview image 816 as compared to the path 820 of the full-resolution output image 818. The path 822 for the preview image 816 is a relatively short path. Accordingly, during optimization, instead of the traversing through the entire GAN at each iteration (as with path 820), the shorter path 822 used for the preview image 816 allows for faster inference.

Figure 9:
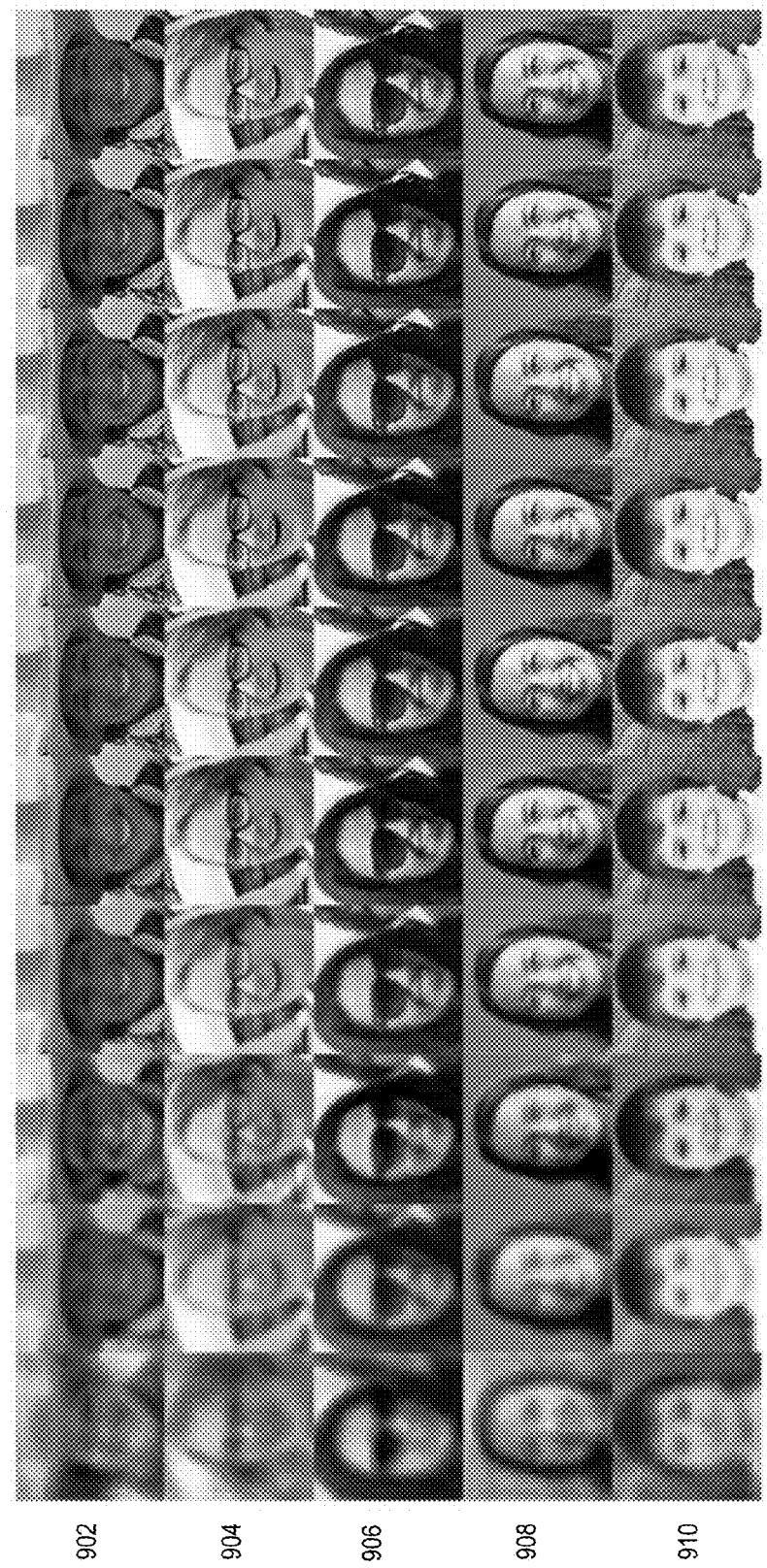
FIG. 9 depicts examples of generated images using the techniques of FIG. 6, according to certain embodiments of the present disclosure.

FIG. 9 depicts examples of images 900 generated and edited using the techniques of FIG. 6, according to certain embodiments of the present disclosure. Rows 902, 904, 906, 908, and 910 each show a series of images that are generated and edited to smile based on a different respective input image. Columns 912, 916, 920, 924, and 928 are preview images generated using a GAN with auxiliary neural networks for the respective preview images, as described above with respect to FIG. 6. From left to right, each column represents a larger layer of the generator neural network which is further from the input layer and generates a higher-resolution image. For comparison, columns 914, 918, 922, 926, and 930 show images generated by taking an output image from the output layer of the GAN and downsampling the output image. As shown in FIG. 9, the preview images, which are generated relatively quickly on the order of 1-4 seconds or less, are a reasonable approximation of the ultimate output image and comparable to the downsampled versions.

These preview images are useful in the context of an editing interface. For example, the editing interface shows a preview thumbnail image of the final edited image as the final edited image is being processed. The low resolution preview images can be shown very fast without having to wait for the final image. The displayed thumbnail image can be updated as images of higher resolution are available.

Figure 10:
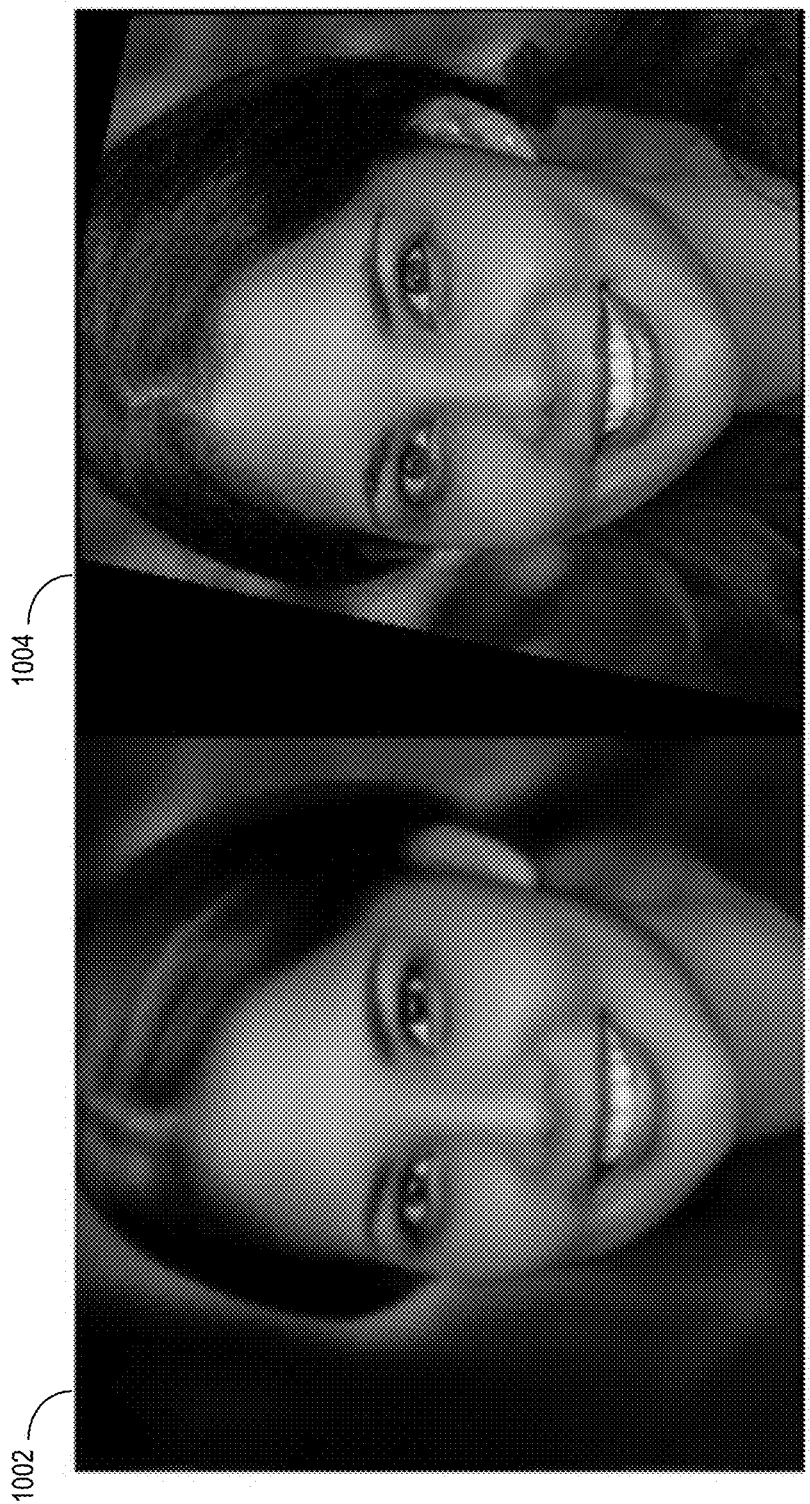
FIG. 10 depicts additional examples of generated images using the techniques of FIG. 6, according to certain embodiments of the present disclosure.

FIG. 10 depicts additional examples of generated images 1002 and 1004 generated using the techniques of FIG. 6, according to certain embodiments of the present disclosure. Image 1004 (right) shows a generated image which has been output via the output layer of the generator. Image 1004 was generated after optimizing the latent space representation (as described above with respect to FIGS. 3A-3B) for about 8 seconds. Image 1004 has a resolution of 1024×1024 pixels. Image 1002 (left) shows a generated image which has been output from an intermediate layer of the generator, based on the same input image as image 1004. Image 1002 was generated after optimizing the latent space representation for about 3 seconds. Image 1002 was optimized faster than image 1004, as each pass through the generator involves less processing when extracting the image 1002 from the intermediate layer. Image 1002 has a resolution of 256×256 pixels. As shown in FIG. 10, the image 1002 looks very similar to the final image 1004, but with less detail.

Example Techniques for Domain to Domain Projection

Figure 11:
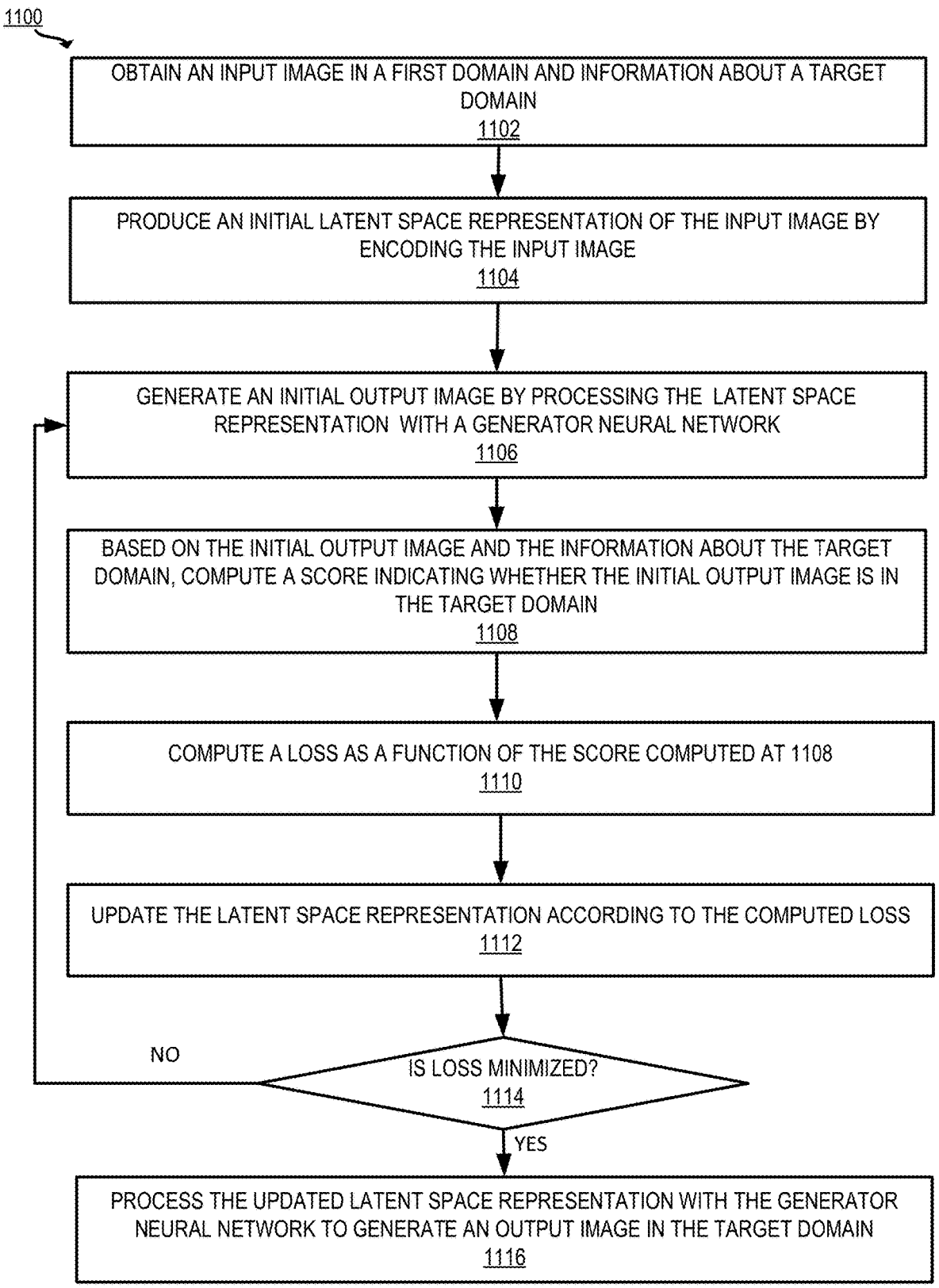
FIG. 11 depicts an example of a process for domain to domain projection to certain embodiments of the present disclosure.

FIG. 11 depicts an example of a process 1100 for generating an image in a different domain (e.g., style) than the input image using a discriminator loss, according to certain embodiments of the present disclosure. In some examples, the projection subsystem projects an image in a first domain such as a collage, sketch, or cartoon, to an image in a second domain, a photorealistic image. In other examples, an image can be projected from photorealistic image to cartoon, from sketch to painting, and so forth. In some aspects, constraints are applied which encourage the latent variable to stay near a particular domain, such as the natural image manifold. The processing depicted in FIG. 11 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 11 and described below is intended to be illustrative and non-limiting. Although FIG. 11 depicts the various processing steps occurring in a particular sequence or order, this is not intended to be limiting. In certain alternative embodiments, the processing may be performed in some different order or some steps may also be performed in parallel. In some implementations, one or more process blocks of FIG. 11 may be performed by a computing system (e.g., the projection subsystem 110 in cooperation with other components of the image editing system 102 of FIG. 1). In some implementations, one or more process blocks of FIG. 11 may be performed by another device or a group of devices separate from or including the image editing system 102 (e.g., the editor interface 104 executing on a user device). In some embodiments, the process 1100 is performed using a pipeline that includes a GAN comprising a generator neural network and a discriminator neural network, as shown in FIG. 1.

In some embodiments, at 1102, the projection subsystem obtains an input image in a first domain and information about a target domain. For example, the projection subsystem obtains the input image via the editor interface. A user may upload an input image to be edited, as described above with respect to block 302 of FIG. 3. The first domain is a particular image style, examples of which include a sketch, a painting, a cartoon, a three-dimensional (3D) model, a statue, a photo collage, a low-resolution image, and a photorealistic image such as a digital photograph.

The image editing system further receives information about a target domain. The target domain corresponds to an image style different from the first domain, e.g., photorealistic image, sketch, cartoon, etc. The information about the target domain may include a target latent code corresponding to the target domain. The target latent code w_target can be a selected latent code such as the mean latent code from the training of the GAN. In some implementations, a user can provide a user-specified guiding latent code w_target, which allows for increased control in steering the latent code towards a desired style. In some embodiments, the projection subsystem uses the target latent code to identify a target output of the discriminator neural network. For example, the projection subsystem computes the target discriminator output as a function of the generator output using a target latent code—

$$D(G(w\_target))$$

The target latent code is provided as input to the generator neural network to generate a target image. The generator neural network is configured to take a latent space representation as input and generate an image as output (e.g., as described above with respect to block 308 of FIG. 3A). The target image is then processed by the discriminator neural network to compute the target discriminator output. As described above with respect to FIG. 1, a discriminator may generate a score indicating whether the discriminator has determined that an image generated by the generator is likely to be a real photograph or a computer-generated copy. This can be binary (e.g., 1=photograph; 0=computer-generated copy), or a score indicating confidence that the image is a real photograph (e.g., 100=definitely a real photograph; 0=definitely a computer-generated copy, with values in between corresponding to confidence level). In other examples, the GAN is trained on images from a domain such as impressionist paintings. In this case, the discriminator has been trained to identify whether an image is in the style of impressionist paintings, and this is indicated by the score output by the discriminator.

Alternatively, the received information about the target domain may be the target discriminator output itself. In this case, the target discriminator output may, for example, be computed by an external system or configured by an administrator.

At 1104, the projection subsystem produces an initial latent space representation of the input image by encoding the input image. For example, the projection subsystem produces the initial latent space representation by passing the input image as input to an encoder neural network configured to output a latent space representation of an input image, as described above with respect to block 306 of FIG. 3A.

At 1106, the image editing system generates an initial output image by processing the latent space representation with the generator neural network. The generator neural network is configured to take a latent space representation as input and generate an image as output (e.g., as described above with respect to block 308 of FIG. 3A). The image editing system outputs the initial output image.

At 1108, based on the initial output image and the information about the target domain, the image editing system computes a score indicating whether the initial output image is in the target domain. The score may correspond to the output of the discriminator neural network after receiving the initial output image generated at 1106 as input:

$$D(G(w))$$

As described above with respect to block 1102, the output of the discriminator, when given an input image, represents a confidence that the image is in the domain that the discriminator has been trained on. Thus, if the target domain is that of photorealistic images, a discriminator trained on photorealistic images will output a score indicating whether the image generated at 1106 is a photorealistic image. If the target domain is that of sculptures, a discriminator trained on cartoons will output a score indicating whether the image generated at 1106 is a cartoon, and so forth.

At 1110, the image editing system computes a loss as a function of the score computed at 1108. This may be a component of an overall loss function based on discriminator output. An example of such a discriminator loss component is:

$$\|D(G(w))-D(G(w\_target))\|$$

the normalized difference between the score computed at 1108 and the target discriminator output (e.g., the target domain information obtained at 1102 or a derivative thereof). The discriminator loss can be used to constrain the latent space representation towards the domain in which the GAN has been trained. For example, using a GAN such as StyleGAN, which has been trained to generate photorealistic images of faces, minimizing the discriminator loss will pull the latent space representation towards the domain of photorealistic images of faces. Applying the discriminator loss for a GAN that has been trained on a particular domain of images will enforce that domain. For example, the discriminator loss can be used to constrain the latent space representation towards domains such as anime cartoons of faces, paintings of shoes, and so forth, based on the type of images used to train the discriminator.

In some implementations, the loss function includes additional components, which may be similar to those described above with respect to FIG. 3B. In some embodiments, the loss function includes a latent loss component. For example, the latent loss component is based on a difference between the initial latent space representation and a target latent code. As a specific example, the latent loss component is $$\|w\_target-w\|$$

the normalized difference between target latent code and the initial latent space representation. The target latent code may, for example, include a mean latent code from a training phase of the generator neural network or a user-selected target latent code, as described above with respect to block 358 of FIG. 3B and block 1102.

In alternative or additional implementations, the loss further includes a pixel loss component and/or a perceptual loss component. As described above with respect to FIG. 3B, a pixel loss component such as $$\text{PixelLoss}(G(w),x)$$

can be computed by comparing the output of the generator with an input initial latent space representation to the original input image. Examples of perceptual loss are further described above with respect to block 356 of FIG. 3B.

A perceptual loss component $$\text{PerceptualLoss}(G(w),x)$$

may be computed by extracting perceptual features extracted from the input image and perceptual features extracted an image from an image generated from the initial latent space representation, as described above with respect to blocks 352-354 of FIG. 3B.

Accordingly, in some implementations, the loss includes a discriminator output component, a latent loss component, a perceptual loss component, and a pixel loss component. An example of such a loss function is:

$$\text{Loss}(w,x,w\_target)=\text{PixelLoss}(G(w),x)+\text{Perceptual-}\\\text{Loss}(G(w),x)+\|w\_target-w\|+\|D(G(w\_target))-D\\(G(w))\|$$

In some implementations, the projection subsystem further includes an identity loss term to guide the projection towards a particular image. This allows for projecting to a GAN manifold, but guides the projection based on a user-specified image. For example, if a user wants to project an image of a sketch to a GAN manifold of realistic faces but wants the result to look more like a certain person, the user can also provide as input an image of that person. To guide the projection towards a domain such as photorealism while preserving identity, the projection subsystem can further include an additional loss component comparing the output of a face recognition model of the target image x (or any other image) and the GAN output G(w). An example of a suitable face recognition model is ArcFace, as described in Deng et. al., *ArcFace: Additive Angular Margin Loss for Deep Face Recognition*, arXiv:1801.07698 (2019). The identity loss, $$\text{IdentityLoss}(G(w),x)$$

can be part of an overall loss function such as:

$$F(w,x,w\_target)=\text{PixelLoss}(G(w),x)+\text{PerceptualLoss}\\(G(w),x)+\|D(G(w\_target))-D(G(w))\|+\text{Identity-}\\\text{Loss}(G(w),x).$$

At 1112-1114, upon selecting and computing a suitable loss function, the projection subsystem minimizes the loss to compute an updated latent space representation of the input image. The projection subsystem may use a suitable optimizer to find a value of w to minimize the loss. For example, the projection subsystem computes:

$$\text{argmin } w=\text{PixelLoss}(G(w),x)+\text{PerceptualLoss}(G(w),\\x)+\|w\_target-w\|+\|D(G(w\_target))-D(G(w))\|$$

In some implementations, the projection subsystem applies the Limited-memory Broyden-Fletcher-Goldfarb-Shanno algorithm (L-BFGS) to minimize the loss function and identify the optimized w value, as described above with respect to blocks 312-314 of FIG. 3A.

In some embodiments, the projection subsystem updates the latent space representation iteratively based on the computed loss (e.g., to generate a first updated latent space representation, a second updated latent space representation, and so forth). This can be repeated until eventually the latent space representation is sufficiently optimized (e.g., "yes" at 314, indicating optimization has converged), at which point the process 1100 proceeds to 1116.

One or more operations in blocks 1106-1114 implement a step for updating the initial latent space representation by minimizing a loss based on score generated using the discriminator neural network. For instance, at block 1106, the projection subsystem generates an initial output image using the generator neural network, at block 1108, the projection subsystem computes a score using the discriminator neural network, at 1110, the image editing system computes a loss as a function of the score computed at 1108, and at 1112-1114, the image editing system minimizes a loss as a function of the computed score to update the latent space representation of the input image, as described above.

Figure 12:
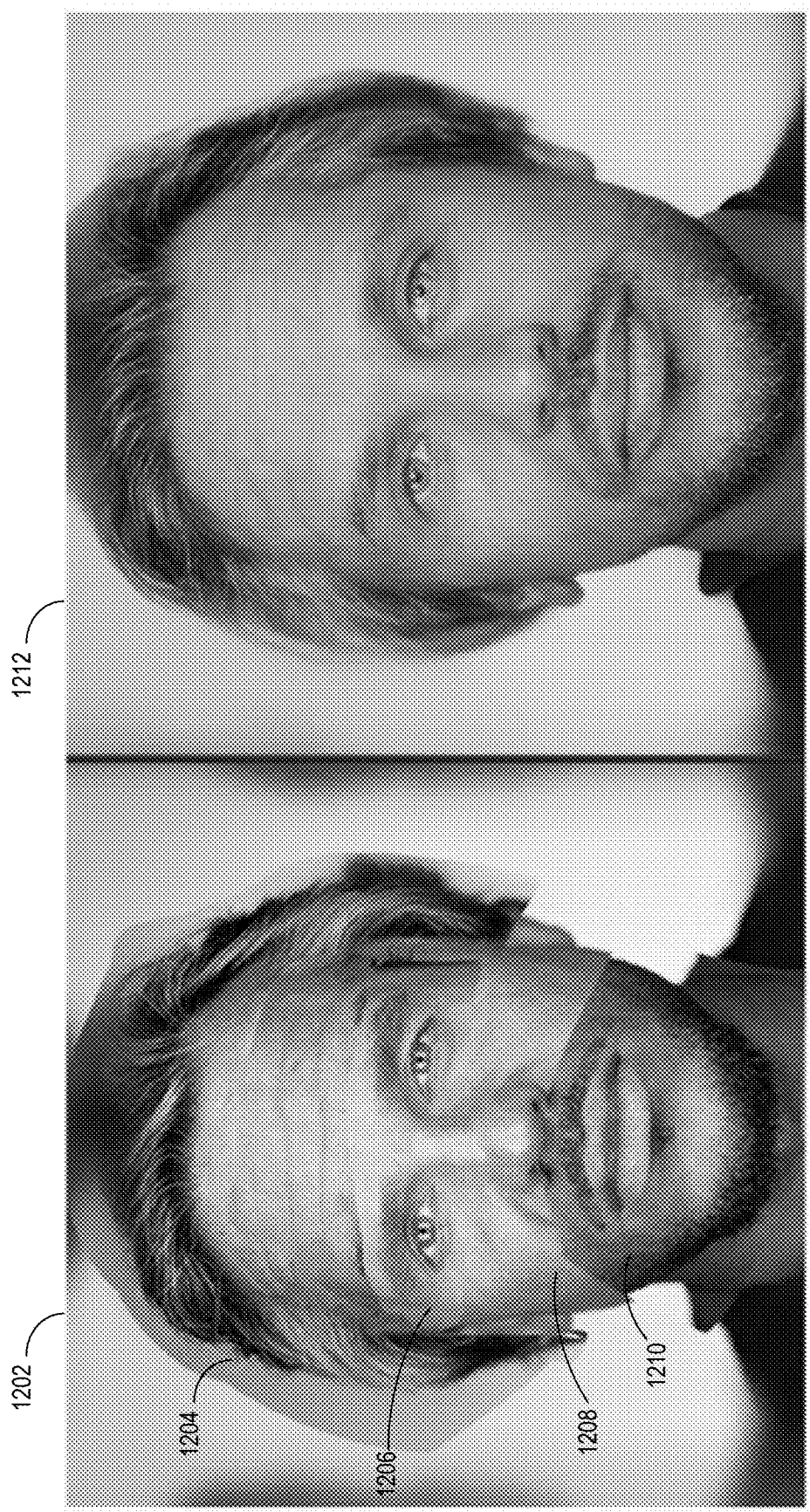
FIG. 12 depicts examples of images illustrating using a collage to generate a realistic image using the techniques of FIG. 11 according to certain embodiments of the present disclosure.
Figure 13:
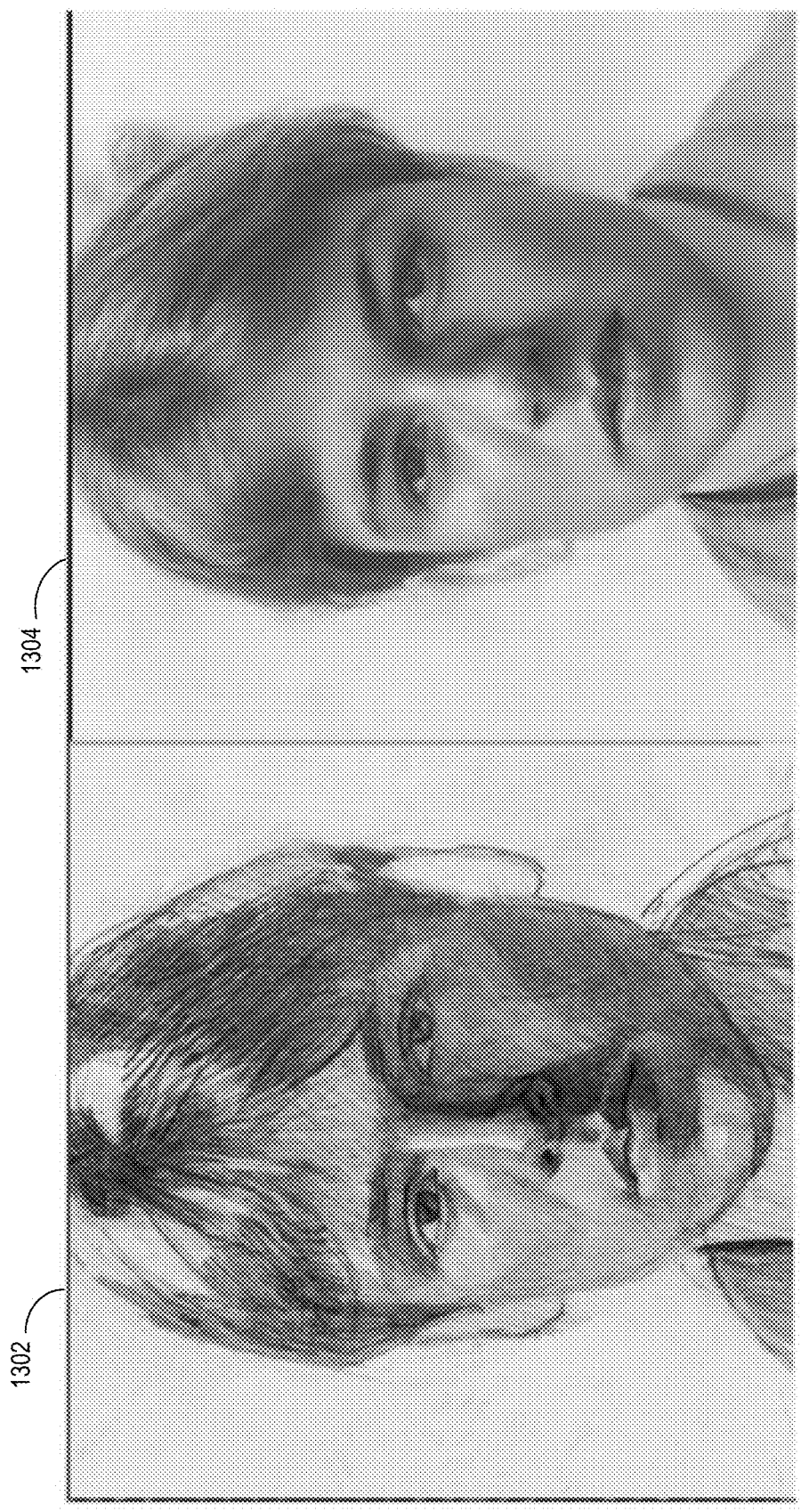
FIG. 13 depicts examples of images illustrating using a sketch to generate a realistic image using the techniques of FIG. 11 according to certain embodiments of the present disclosure.
Figure 14:
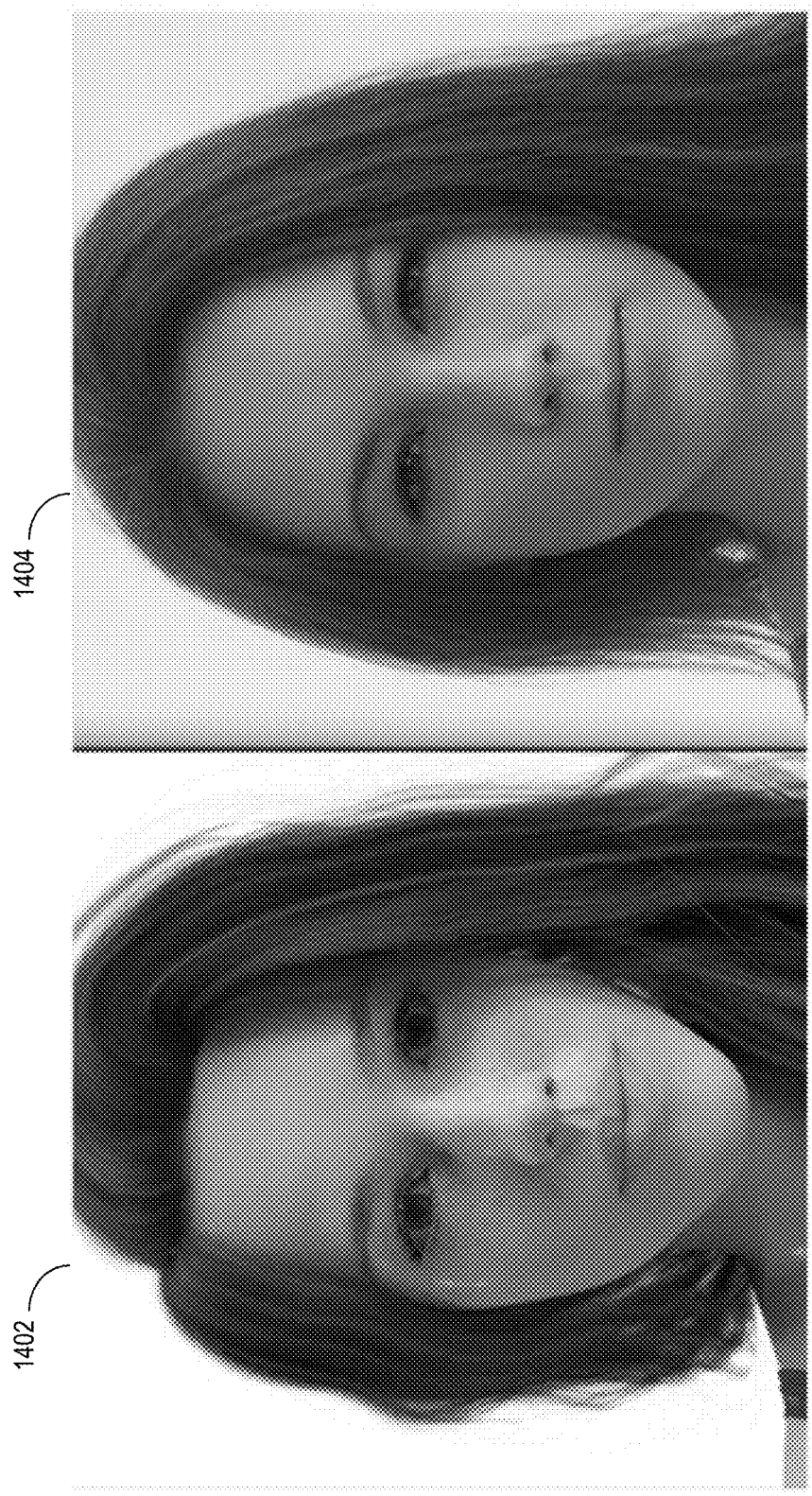
FIG. 14 depicts examples of images illustrating using a three-dimensional (3D) drawing to generate a realistic image using the techniques of FIG. 11 according to certain embodiments of the present disclosure.

In some embodiments, at 1116, the image editing system processes the updated latent space representation with the generator neural network to generate an output image in the target domain. This may be performed in a similar fashion as described above with respect to block 308 of FIG. 3A. The image generated using the updated latent space representation will be constrained towards the domain used to train the generator neural network and the discriminator neural network. For example, using StyleGAN (supra), the output image will be constrained to the domain of photorealistic images of faces (the target domain in this example). Examples of images projected towards realism in this fashion are illustrated in FIGS. 12-14. Alternatively, or additionally, the second domain may correspond to anime style, impressionist painting style, etc., when using a GAN trained on the domain of interest. Applications of the process 1100 include using a collage to generate a photorealistic output image of a face (as described below with respect to FIG. 12). Other applications include generating a cartoon from a photograph, generating a photorealistic landscape from a landscape painting, and various other applications of taking input from one domain and projecting it onto another domain.

In some implementations (e.g., before 1102), the training subsystem of the image editing system trains the encoder neural network. For example, the training subsystem trains the encoder neural network on randomly-generated synthetic images mapped from a Gaussian distribution. Improved domain to domain projection is obtained when the encoder has been trained on synthetic data. For example, the encoder is trained to project images to the StyleGAN latent space by training the encoder on randomly generated synthetic images G_synthesis(G_mapping(z)) where z is a Gaussian random variable. In some aspects, the Gaussian distribution is truncated. For example, training subsystem uses a Gaussian distribution truncated at a value between 0.6 and 0.8 (e.g., truncated at 0.7).

As described above with respect to FIGS. 3A-3B, the optimization techniques of the present disclosure can be used to provide very fast (e.g., about 8 seconds) results, while maintaining high resolution (e.g., 1024×1024 pixels) and aesthetically pleasing results. Applying these techniques to domain to domain projection using the discriminator loss provides a way to project an image from one domain to another quickly and at high resolution.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

Example Results—Domain to Domain Projection

FIG. 12 depicts examples of images illustrating a photo collage 1202 which is merged to generate a photorealistic image 1212 using the techniques of FIG. 11. In some implementations, the image editing system provides a user interface for generating a collage of facial features 1202, (e.g., as part of the editor interface 104 of FIG. 1).

For example, the image editing system displays a user interface. The image editing system receives input from a user to generate a collage using a set of initial images. The editor interface may provide upload elements configured to accept user input to upload a set of images. The editor interface may further provide editing elements configured to receive user input to cut and paste the images to create a photo collage. As shown in FIG. 12, the top portion of the head 1204 is from one image, the eyes 1206 are from another image, the middle portion of the head 1208 is from another image, and the mouth and chin 1210 are from yet another image. The user can interact with the editor interface to cut and arrange the images to generate the collage 1202.

Once the collage 1202 has been configured, the collage 1202 is passed as input for the processing of FIG. 11. The collage is encoded and optimized before generating an image using a generator neural network. The processing of FIG. 11 is used to enforce realism in the optimization process. In the example illustrated in FIG. 12, the output image 1212 is a photorealistic image generated from the collage 1202.

The collage feature can be useful for generating a photorealistic face using a combination of facial features, as shown in FIG. 12. Other useful applications of the collage feature include combining home decor elements to blend to a photorealistic image for use in interior design or landscaping, or combining clothing items to blend to a photorealistic image of an outfit. In other examples, the domain constraint of FIG. 11 may be constrained towards another domain, other than realism (e.g., to a cartoon-like image), and the collage can be processed to generate a cartoon-like image, a sketch-like image, and so forth.

FIG. 13 depicts examples of images illustrating using a sketch to generate a more photorealistic image using the techniques of FIG. 11. In some applications, a sketch 1302 is the input image obtained at block 1102 of FIG. 11. The output image generated at block 1116 of FIG. 11 is a more photorealistic image of a face 1304. Accordingly, as shown in FIG. 13, the projection techniques of FIG. 11 can be used to make an artistic sketch look more like a photorealistic face.

FIG. 14 depicts examples of images illustrating using a three-dimensional (3D) drawing to generate a photorealistic image using the techniques of FIG. 11 according to certain embodiments of the present disclosure. In some applications, a 3D drawing 1402 is the input image obtained at block 1102 of FIG. 11. The output image generated at block 1116 of FIG. 11 looks more like a photorealistic image 1404. Accordingly, as shown in FIG. 14, the projection techniques of FIG. 11 can be used to make a 3D drawing look more like a photorealistic face.

Example of a Computing System for GAN Based Image Processing

Any suitable computing system or group of computing systems can be used for performing the operations described herein. For example, FIG. 15 depicts examples of computing system 1500 that executes an image editing system 102 that includes an edit management subsystem 120 for performing image processing as described herein. In some embodiments, the computing system 1500 also executes a projection subsystem 110 for performing latent space projection as described herein, an image generation subsystem 130 for performing image generation as described herein, a training subsystem 140 for performing machine learning model training as described herein, and an editor interface 104 for controlling input and output to configure image edits as described herein. In other embodiments, a separate computing system having devices similar to those depicted in FIG. 15 (e.g., a processor, a memory, etc.) executes one or more of the subsystems 110-140 and the editor interface 104.

The depicted examples of a computing system 1500 includes a processor 1502 communicatively coupled to one or more memory devices 1504. The processor 1502 executes computer-executable program code stored in a memory device 1504, accesses information stored in the memory device 1504, or both. Examples of the processor 1502 include a microprocessor, an application-specific integrated circuit ("ASIC"), a field-programmable gate array ("FPGA"), or any other suitable processing device. The processor 1502 can include any number of processing devices, including a single processing device.

The memory device 1504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1500 may also include a number of external or internal devices, such as input or output devices. For example, the computing system 1500 is shown with one or more input/output ("I/O") interfaces 1508. An I/O interface 1508 can receive input from input devices or provide output to output devices. One or more buses 1506 are also included in the computing system 1500. The bus 1506 communicatively couples one or more components of a respective one of the computing system 1500.

The computing system 1500 executes program code that configures the processor 1502 to perform one or more of the operations described herein. The program code includes, for example, the image editing system 102, including the projection subsystem 110, the edit management subsystem 120, the image generation subsystem 130, the training subsystem 140, the editor interface 104, or other suitable applications that perform one or more operations described herein. The program code may be resident in the memory device 1504 or any suitable computer-readable medium and may be executed by the processor 1502 or any other suitable processor. In some embodiments, the projection subsystem 110, the edit management subsystem 120, the image generation subsystem 130, the training subsystem 140, and the editor interface 104 are stored in the memory device 1504, as depicted in FIG. 15. In additional or alternative embodiments, one or more of the image the projection subsystem 110, the edit management subsystem 120, the image generation subsystem 130, the training subsystem 140, and the editor interface 104 are stored in different memory devices of different computing systems. In additional or alternative embodiments, the program code described above is stored in one or more other memory devices accessible via a data network.

The computing system 1500 can access data in any suitable manner. In some embodiments, some or all of one or more of these data sets, models, and functions are stored in the memory device 1504, as in the example depicted in FIG. 15. For example, a computing system 1500 that executes the training subsystem 140 can access training data stored by an external system.

In additional or alternative embodiments, one or more of these data sets, models, and functions are stored in the same memory device (e.g., one of the memory devices 1504). For example, a common computing system can host the edit management subsystem 120 and the training subsystem 140 as well as the training data. In additional or alternative embodiments, one or more of the programs, data sets, models, and functions described herein are stored in one or more other memory devices accessible via a data network.

The computing system 1500 also includes a network interface device 1510. The network interface device 1510 includes any device or group of devices suitable for establishing a wired or wireless data connection to one or more data networks. Non-limiting examples of the network interface device 1510 include an Ethernet network adapter, a modem, and the like. The computing system 1500 is able to communicate with one or more other computing devices (e.g., a computing device executing the editor interface 104 as depicted in FIG. 1) via a data network using the network interface device 1510.

In some embodiments, the functionality provided by the computing system 1500 may be offered via a cloud-based service provided by a cloud infrastructure 1600 provided by a cloud service provider. For example, FIG. 16 depicts an example of a cloud infrastructure 1600 offering one or more services including image editing software as-a-service 1604 that offers image editing functionality as described in this disclosure. Such a service can be subscribed to and used by a number of user subscribers using user devices 1610A, 1610B, and 1610C across a network 1608. The service may be offered under a Software as a Service (SaaS) model. One or more users may subscribe to such as service.

In the embodiment depicted in FIG. 16, the cloud infrastructure 1600 includes one or more server computer(s) 1602 that are configured to perform processing for providing one or more services offered by the cloud service provider. One or more of server computer(s) 1602 may implement a projection subsystem 110, edit management subsystem 120, image generation subsystem 130, and training subsystem 140, as depicted in FIG. 15. The subsystems 110-140 may be implemented using software only (e.g., code, program, or instructions executable by one or more processors provided by cloud infrastructure 1600), in hardware, or combinations thereof. For example, one or more of the server computer(s) 1602 may execute software to implement the services and functionalities provided by subsystems 110-140, where the software, when executed by one or more processors of the server computer(s) 1602, causes the services and functionalities to be provided.

The code, program, or instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 1602 can include volatile memory, non-volatile memory, or a combination thereof.

In the embodiment depicted in FIG. 16, cloud infrastructure 1600 also includes a network interface device 1606 that enables communications to and from cloud infrastructure 1600. In certain embodiments, the network interface device 1606 includes any device or group of devices suitable for establishing a wired or wireless data connection to the network 1608. Non-limiting examples of the network interface device 1606 include an Ethernet network adapter, a modem, and/or the like. The cloud infrastructure 1600 is able to communicate with the user devices 1610A, 1610B, and 1610C via the network 1608 using the network interface device 1606.

An editor interface (e.g., editor interface 104A, editor interface 104B, and editor interface 104C) may be displayed on each of the user devices user device A 1610A, user device B 1610B, and user device C 1610C. A user of user device 1610A may interact with the displayed editor interface, for example, to enter an input image and/or image modification parameters. In response, processing for image processing may be performed by the server computer(s) 1602.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method comprising:
producing a latent space representation of an input image;
accessing a generator neural network comprising an input layer, an output layer, a plurality of intermediate layers, and coupled to an auxiliary neural network comprising a set of residual layers, wherein the auxiliary neural network is coupled to an intermediate layer of the plurality of intermediate layers;
generating a first output image at a first resolution by providing the latent space representation of the input image as input to the generator neural network to generate a first initial output of the intermediate layer, performing optimization including minimizing a loss function with respect to the first initial output to generate a first optimized output, and providing the first optimized output to the auxiliary neural network via the intermediate layer, which outputs the first output image;
causing display of the first output image as a rapid preview image;
generating a second output image at a second resolution higher than the first resolution by providing the latent space representation of the input image as input to the generator neural network to generate a second initial output of the output layer, performing optimization including minimizing a loss function with respect to the second initial output to generate a second optimized output, and providing the second optimized output to the output layer of the generator neural network, which outputs the first output image; and
subsequent to causing display of the first output image as a rapid preview image, causing display of the second output image as a higher resolution output image.

2. The method of claim 1, wherein the input image has a third resolution, the method further comprising training the auxiliary neural network by:
- generating a training image with a fourth resolution less than the third resolution;
- extracting features from the intermediate layer of the generator neural network; and
- minimizing a loss between the training image and the extracted features from the intermediate layer.

3. The method of claim 1, wherein the intermediate layer is a first intermediate layer, the method further comprising:
- generating a third output image at a fifth resolution different from the first resolution and the second resolution by providing the latent space representation of the input image as input to the generator neural network and taking the third output image from a second intermediate layer, of the plurality of intermediate layers of the generator neural network.

4. The method of claim 3, wherein:
- the first resolution is lower than the fifth resolution; and
- the first intermediate layer is closer to the input layer than the second intermediate layer.

5. The method of claim 1, wherein the first output image is generated in less than about five seconds after obtaining the input image.

6. A computing system comprising:
- a processor;
- a non-transitory computer-readable medium comprising instructions which, when executed by the processor, perform processing comprising:
- producing a latent space representation of an input image;
- accessing a generator neural network comprising an input layer, an output layer, a plurality of intermediate layers, and coupled to an auxiliary neural network comprising a set of residual layers, wherein the auxiliary neural network is coupled to an intermediate layer of the plurality of intermediate layers;
- generating a first output image at a first resolution by providing the latent space representation of the input image as input to the generator neural network to generate a first initial output of the intermediate layer, performing optimization including minimizing a loss function with respect to the first initial output to generate a first optimized output, and providing the first optimized output to the auxiliary neural network via the intermediate layer, which outputs the first output image;
- causing display of the first output image as a rapid preview image;
- generating a second output image at a second resolution higher than the first resolution by providing the latent space representation of the input image as input to the generator neural network to generate a second initial output of the output layer, performing optimization including minimizing a loss function with respect to the second initial output to generate a second optimized output, and providing the second optimized output to the output layer of the generator neural network, which outputs the first output image; and
- subsequent to causing display of the first output image as a rapid preview image, causing display of the second output image as a higher resolution output image.

7. The computing system of claim 6, wherein the input image has a third resolution, the processing further comprising training the auxiliary neural network by:
- generating a training image with a fourth resolution less than the third resolution;
- extracting features from the intermediate layer of the generator neural network; and
- minimizing a loss between the training image and the extracted features from the intermediate layer.

8. The computing system of claim 6, wherein the intermediate layer is a first intermediate layer, the processing further comprising:
- generating a third output image at a fifth resolution different from the first resolution and the second resolution by providing the latent space representation of the input image as input to the generator neural network and taking the third output image from a second intermediate layer, of the plurality of intermediate layers of the generator neural network.

9. The computing system of claim 8, wherein:
- the first resolution is lower than the fifth resolution; and
- the first intermediate layer is closer to the input layer than the second intermediate layer.

10. The computing system of claim 6, wherein the first output image is generated in less than about five seconds after obtaining the input image.

11. A non-transitory computer-readable medium having instructions stored thereon, the instructions executable by a processing device to perform operations comprising:
- generating a latent space representation of an input image;
- accessing a generator neural network comprising an input layer, an output layer, a plurality of intermediate layers, and coupled to an auxiliary neural network comprising a set of residual layers, wherein the auxiliary neural network is coupled to an intermediate layer of the plurality of intermediate layers;
- a step for generating a first output image at a first resolution using the intermediate layer of the generator neural network, including generating a first initial output of the intermediate layer, performing optimization including minimizing a loss function with respect to the first initial output to generate first optimized output, and providing the first optimized output to the auxiliary neural network via the intermediate layer, which outputs the first output image;
- causing display of the first output image as a rapid preview image;
- a step for generating a second output image at a second resolution different from the first resolution using the output layer of the generator neural network, including generating a second initial output of the output layer, performing optimization including minimizing a loss function with respect to the second initial output to generate second optimized output, and providing the second optimized output to the output layer, which outputs the second output image; and
- subsequent to causing display of the first output image as a rapid preview image, causing display of the second output image as a higher resolution output image.

12. The medium of claim 11, wherein the input image has a third resolution, the operations further comprising training the auxiliary neural network by:
- generating a training image with a fourth resolution less than the third resolution;
- extracting features from the intermediate layer of the generator neural network; and
- minimizing a loss between the training image and the extracted features from the intermediate layer.

13. The medium of claim 11, wherein the intermediate layer is a first intermediate layer, the operations further comprising:

generating a third output image at a fifth resolution different from the first resolution and the second resolution by providing the latent space representation of the input image as input to the generator neural network and taking the third output image from a second intermediate layer of the generator neural network.

14. The medium of claim 11, wherein the first output image is generated in less than about five seconds after obtaining the input image.

\* \* \* \* \*